US012650944B2

(12) United States Patent
Malladi et al.

(10) Patent No.: US 12,650,944 B2
(45) Date of Patent: Jun. 9, 2026

(54) SYSTEM WITH CACHE-COHERENT MEMORY AND SERVER-LINKING SWITCH

(71) Applicant: Samsung Electronics Co., Ltd., Suwon-si (KR)

(72) Inventors: Krishna Teja Malladi, San Jose, CA (US); Andrew Chang, Los Altos, CA (US); Ehsan M. Najafabadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/381,571

(22) Filed: Oct. 18, 2023

(65) Prior Publication Data

US 2024/0045823 A1 Feb. 8, 2024

Related U.S. Application Data

(63) Continuation of application No. 17/887,379, filed on Aug. 12, 2022, now Pat. No. 11,841,814, which is a
(Continued)

(51) Int. Cl.
*G06F 13/40* (2006.01)
*G06F 3/06* (2006.01)
(Continued)

(52) U.S. Cl.
CPC ........ *G06F 13/4027* (2013.01); *G06F 3/0604* (2013.01); *G06F 3/0619* (2013.01);
(Continued)

(58) Field of Classification Search
CPC ......................... G06F 12/0246; G06F 12/0813
See application file for complete search history.

(56) References Cited

U.S. PATENT DOCUMENTS

| | | | |
|---|---|---|---|
| 6,119,150 A | | 9/2000 | Fujii et al. |
| 6,449,699 B2 | | 9/2002 | Franke et al. |
(Continued)

FOREIGN PATENT DOCUMENTS

| | | |
|---|---|---|
| CN | 1268704 A | 10/2000 |
| CN | 101127009 A | 2/2008 |
(Continued)

OTHER PUBLICATIONS

EPO Office Action dated Jan. 3, 2024, issued in corresponding European Patent Application No. 21158412.3 (10 pages).
(Continued)

*Primary Examiner* — Getente A Yimer
(74) *Attorney, Agent, or Firm* — Womble Bond Dickinson (US) LLP

(57) ABSTRACT

A system and method for managing memory resources. In some embodiments the system includes a first server, a second server, and a server-linking switch connected to the first server and to the second server. The first server may include a stored-program processing circuit, a cache-coherent switch, and a first memory module. In some embodiments, the first memory module is connected to the cache-coherent switch, the cache-coherent switch is connected to the server-linking switch, and the stored-program processing circuit is connected to the cache-coherent switch.

20 Claims, 11 Drawing Sheets

Related U.S. Application Data continuation of application No. 17/026,074, filed on Sep. 18, 2020, now Pat. No. 11,416,431.

(60) Provisional application No. 63/068,054, filed on Aug. 20, 2020, provisional application No. 63/057,746, filed on Jul. 28, 2020, provisional application No. 63/031,509, filed on May 28, 2020, provisional application No. 63/031,508, filed on May 28, 2020, provisional application No. 63/006,073, filed on Apr. 6, 2020.

(51) Int. Cl.

| | |
|---|---|
| *G06F 9/4401* | (2018.01) |
| *G06F 12/0802* | (2016.01) |
| *G06F 12/0808* | (2016.01) |
| *G06F 12/1045* | (2016.01) |
| *G06F 13/16* | (2006.01) |
| *G06F 13/28* | (2006.01) |
| *G06F 13/42* | (2006.01) |
| *G06F 15/173* | (2006.01) |
| *H04L 49/45* | (2022.01) |
| *H04L 49/351* | (2022.01) |

(52) U.S. Cl.
CPC .......... *G06F 3/0625* (2013.01); *G06F 3/0629* (2013.01); *G06F 3/0647* (2013.01); *G06F 3/0653* (2013.01); *G06F 3/0659* (2013.01); *G06F 3/067* (2013.01); *G06F 3/0679* (2013.01); *G06F 9/4401* (2013.01); *G06F 12/0802* (2013.01); *G06F 12/0808* (2013.01); *G06F 12/1045* (2013.01); *G06F 13/1663* (2013.01); *G06F 13/28* (2013.01); *G06F 13/4022* (2013.01); *G06F 13/4068* (2013.01); *G06F 13/409* (2013.01); *G06F 13/4221* (2013.01); *G06F 15/17331* (2013.01); *H04L 49/45* (2013.01); *G06F 2212/621* (2013.01); *G06F 2213/0026* (2013.01); *G06F 2213/28* (2013.01); *H04L 49/351* (2013.01)

(56) References Cited

U.S. PATENT DOCUMENTS

| | | | |
|---|---|---|---|
| 6,922,756 B2 | 7/2005 | Hum et al. | |
| 8,719,464 B2 | 5/2014 | Kegel et al. | |
| 9,235,519 B2 | 1/2016 | Lih et al. | |
| 9,280,468 B2 | 3/2016 | Lecler | |
| 9,430,161 B2 | 8/2016 | Yamazaki et al. | |
| 9,451,027 B1* | 9/2016 | Kunkel .................. H04L 69/329 | |
| 9,479,457 B2 | 10/2016 | Sindhu | |
| 9,483,318 B2 | 11/2016 | Vajapeyam | |
| 9,619,389 B1 | 4/2017 | Roug | |
| 9,710,173 B2 | 7/2017 | Feng et al. | |
| 9,767,903 B2 | 9/2017 | Cho | |
| 9,916,241 B2 | 3/2018 | McKean et al. | |
| 10,019,360 B2 | 7/2018 | Wang et al. | |
| 10,025,626 B2 | 7/2018 | Clayton et al. | |
| 10,044,829 B2 | 8/2018 | Lai et al. | |
| 10,051,056 B2 | 8/2018 | Lin | |
| 10,091,295 B1 | 10/2018 | Savic et al. | |
| 10,310,995 B1 | 6/2019 | Malygin et al. | |
| 10,331,588 B2 | 6/2019 | Frandzel et al. | |
| 10,389,800 B2 | 8/2019 | Blainey et al. | |
| 10,523,748 B2 | 12/2019 | Yang et al. | |
| 10,599,548 B2 | 3/2020 | Wang et al. | |
| 10,803,549 B1 | 10/2020 | Wrosz et al. | |
| 10,831,386 B2 | 11/2020 | Voigt | |
| 10,831,404 B2 | 11/2020 | Li | |
| 10,866,911 B2 | 12/2020 | Qiu et al. | |
| 10,884,662 B2 | 1/2021 | Yang | |
| 10,996,892 B2 | 5/2021 | Gibb et al. | |
| 11,100,028 B1 | 8/2021 | Subramaniam et al. | |
| 11,126,564 B2 | 9/2021 | Schlansker et al. | |
| 11,226,846 B2 | 1/2022 | Lubsey et al. | |
| 11,232,058 B2 | 1/2022 | Jen et al. | |
| 11,409,465 B2 | 8/2022 | Nimmagadda et al. | |
| 11,409,685 B1 | 8/2022 | Kaplan et al. | |
| 11,461,262 B2 | 10/2022 | Li | |
| 11,599,482 B2 | 3/2023 | Yeung et al. | |
| 11,620,505 B2 | 4/2023 | Jang et al. | |
| 11,669,481 B2 | 6/2023 | Jen et al. | |
| 11,741,034 B2 | 8/2023 | Nam et al. | |
| 12,197,345 B2 | 1/2025 | Qiu et al. | |
| 2002/0018484 A1 | 2/2002 | Kim | |
| 2002/0083275 A1 | 6/2002 | Kawamoto et al. | |
| 2004/0133409 A1 | 7/2004 | Mukherjee et al. | |
| 2005/0137757 A1 | 6/2005 | Phelan et al. | |
| 2005/0160430 A1 | 7/2005 | Steely, Jr. et al. | |
| 2006/0063501 A1 | 3/2006 | Adkisson et al. | |
| 2006/0230119 A1 | 10/2006 | Hausauer et al. | |
| 2007/0220231 A1* | 9/2007 | Sakthivelu .......... G06F 12/1009 |
| | | | 711/E12.067 |
| 2008/0025289 A1 | 1/2008 | Kapur et al. | |
| 2010/0165984 A1 | 7/2010 | Aybay et al. | |
| 2011/0213933 A1 | 9/2011 | Maeda et al. | |
| 2011/0320690 A1 | 12/2011 | Peterson et al. | |
| 2012/0069029 A1 | 3/2012 | Bourd et al. | |
| 2012/0151141 A1 | 6/2012 | Bell, Jr. et al. | |
| 2012/0159101 A1* | 6/2012 | Miyoshi ................ G06F 12/109 |
| | | | 711/E12.103 |
| 2013/0073112 A1 | 3/2013 | Phelan et al. | |
| 2013/0318308 A1 | 11/2013 | Jayasimha et al. | |
| 2014/0115579 A1 | 4/2014 | Kong | |
| 2014/0195672 A1 | 7/2014 | Raghavan et al. | |
| 2014/0359099 A1 | 12/2014 | Wang | |
| 2015/0120971 A1 | 4/2015 | Bae et al. | |
| 2015/0258437 A1 | 9/2015 | Kruglick | |
| 2015/0261434 A1 | 9/2015 | Kagan et al. | |
| 2015/0263985 A1 | 9/2015 | Schmitter et al. | |
| 2015/0331794 A1* | 11/2015 | Ren ......................... G06F 3/064 |
| | | | 709/214 |
| 2015/0347183 A1 | 12/2015 | Borthakur | |
| 2016/0182345 A1 | 6/2016 | Herdich et al. | |
| 2016/0267209 A1 | 9/2016 | Ikram et al. | |
| 2016/0299767 A1 | 10/2016 | Mukadam | |
| 2016/0299860 A1 | 10/2016 | Harriman | |
| 2016/0306574 A1* | 10/2016 | Friedman ............ G06F 12/0802 |
| 2016/0308968 A1* | 10/2016 | Friedman ............ G06F 12/0813 |
| 2016/0328273 A1 | 11/2016 | Molka et al. | |
| 2017/0012844 A1 | 1/2017 | Ellison et al. | |
| 2017/0075576 A1 | 3/2017 | Cho | |
| 2017/0085319 A1 | 3/2017 | Latham et al. | |
| 2017/0187846 A1 | 6/2017 | Shalev et al. | |
| 2017/0228317 A1 | 8/2017 | Drapala et al. | |
| 2017/0295237 A1 | 10/2017 | Ajima | |
| 2017/0300298 A1 | 10/2017 | Ishii | |
| 2017/0300427 A1 | 10/2017 | Lin et al. | |
| 2017/0308483 A1 | 10/2017 | Ishii | |
| 2017/0344294 A1 | 11/2017 | Mishra et al. | |
| 2017/0346915 A1 | 11/2017 | Gay | |
| 2018/0024935 A1 | 1/2018 | Meswani et al. | |
| 2018/0048711 A1 | 2/2018 | Aslam et al. | |
| 2018/0089881 A1 | 3/2018 | Johnson | |
| 2018/0137069 A1* | 5/2018 | Vakharwala ........ G06F 12/1081 |
| 2018/0173466 A1 | 6/2018 | Yang et al. | |
| 2018/0173673 A1* | 6/2018 | Daglis .................... G06F 9/467 |
| 2018/0293489 A1 | 10/2018 | Eyster et al. | |
| 2019/0042138 A1 | 2/2019 | Guim Bernat et al. | |
| 2019/0042388 A1 | 2/2019 | Wang et al. | |
| 2019/0081805 A1 | 3/2019 | Frezza et al. | |
| 2019/0087240 A1 | 3/2019 | Sury et al. | |
| 2019/0102346 A1 | 4/2019 | Wang et al. | |
| 2019/0138934 A1 | 5/2019 | Prakash et al. | |
| 2019/0171373 A1 | 6/2019 | Frank et al. | |
| 2019/0179805 A1 | 6/2019 | Prahlad et al. | |
| 2019/0213130 A1 | 7/2019 | Madugula et al. | |
| 2019/0220319 A1 | 7/2019 | Parees et al. | |
| 2019/0235777 A1 | 8/2019 | Wang et al. | |
| 2019/0243579 A1 | 8/2019 | Li | |
| 2019/0281025 A1 | 9/2019 | Harriman et al. | |

(56) References Cited

U.S. PATENT DOCUMENTS

| | | |
|---|---|---|
| 2019/0297015 A1 | 9/2019 | Marolia et al. |
| 2019/0303345 A1 | 10/2019 | Zhu et al. |
| 2019/0310913 A1 | 10/2019 | Helmick et al. |
| 2019/0384733 A1 | 12/2019 | Jen et al. |
| 2019/0391936 A1 | 12/2019 | Stalley |
| 2020/0012604 A1 | 1/2020 | Agarwal |
| 2020/0019515 A1 | 1/2020 | Koufaty et al. |
| 2020/0021540 A1 | 1/2020 | Marolia et al. |
| 2020/0026556 A1 | 1/2020 | Chitlur et al. |
| 2020/0026656 A1 | 1/2020 | Liao et al. |
| 2020/0029458 A1 | 1/2020 | Jau et al. |
| 2020/0050403 A1 | 2/2020 | Suri et al. |
| 2020/0050570 A1 | 2/2020 | Agarwal et al. |
| 2020/0065290 A1 | 2/2020 | Natu |
| 2020/0089612 A1 | 3/2020 | Rustad et al. |
| 2020/0104189 A1 | 4/2020 | Gopalan et al. |
| 2020/0104275 A1 | 4/2020 | Sen et al. |
| 2020/0125503 A1 | 4/2020 | Graniello et al. |
| 2020/0125529 A1 | 4/2020 | Byers et al. |
| 2020/0125956 A1 | 4/2020 | Ravi et al. |
| 2020/0136943 A1 | 4/2020 | Banyai et al. |
| 2020/0151104 A1 | 5/2020 | Yang |
| 2020/0159449 A1 | 5/2020 | Davis et al. |
| 2020/0167258 A1 | 5/2020 | Chattopadhyay et al. |
| 2020/0192715 A1 | 6/2020 | Wang et al. |
| 2020/0226081 A1 | 7/2020 | Kalyanasundharam et al. |
| 2020/0241926 A1 | 7/2020 | Guim Bernat |
| 2020/0250002 A1 | 8/2020 | Gururaj et al. |
| 2020/0371914 A1* | 11/2020 | Wang .................. G06F 12/0246 |
| 2020/0412798 A1 | 12/2020 | Devireddy et al. |
| 2020/0412802 A1* | 12/2020 | Yang ........................ G06F 15/76 |
| 2021/0011864 A1 | 1/2021 | Guim Bernat et al. |
| 2021/0049101 A1 | 2/2021 | Ray et al. |
| 2021/0058388 A1 | 2/2021 | Knotwell et al. |
| 2021/0064114 A1 | 3/2021 | Troia |
| 2021/0064530 A1 | 3/2021 | Palfer-Sollier et al. |
| 2021/0117360 A1 | 4/2021 | Kutch et al. |
| 2021/0120039 A1 | 4/2021 | Bett et al. |
| 2021/0125048 A1 | 4/2021 | Jang et al. |
| 2021/0200667 A1 | 7/2021 | Bernstein et al. |
| 2021/0247935 A1 | 8/2021 | Beygi et al. |
| 2021/0248094 A1 | 8/2021 | Norman et al. |
| 2021/0311900 A1 | 10/2021 | Malladi et al. |
| 2021/0373778 A1 | 12/2021 | Wu et al. |
| 2022/0100579 A1 | 3/2022 | Lal et al. |
| 2022/0108743 A1 | 4/2022 | Tan et al. |
| 2022/0114128 A1 | 4/2022 | Jen et al. |
| 2022/0147476 A1 | 5/2022 | Nam et al. |
| 2022/0244870 A1 | 8/2022 | Duan et al. |
| 2022/0334932 A1 | 10/2022 | Das Sharma et al. |
| 2022/0334995 A1 | 10/2022 | Das Sharma et al. |
| 2022/0342840 A1 | 10/2022 | Das Sharma et al. |
| 2022/0342841 A1 | 10/2022 | Choudhary et al. |
| 2023/0069339 A1 | 3/2023 | Mai et al. |
| 2023/0401120 A1 | 12/2023 | Gim et al. |
| 2025/0061074 A1 | 2/2025 | Park et al. |

FOREIGN PATENT DOCUMENTS

| | | |
|---|---|---|
| CN | 103109274 A | 5/2013 |
| CN | 104094241 A | 10/2014 |
| CN | 104954251 | 9/2015 |
| CN | 105912275 A | 8/2016 |
| CN | 107430494 A | 12/2017 |
| CN | 107844433 A | 3/2018 |
| CN | 108228082 A | 6/2018 |
| CN | 108702374 A | 10/2018 |
| CN | 106681826 B | 8/2019 |
| CN | 110134329 A | 8/2019 |
| CN | 110659230 A | 1/2020 |
| CN | 110770710 A | 2/2020 |
| CN | 110941576 A | 3/2020 |
| EP | 1235154 A2 | 8/2002 |
| EP | 3916564 A1 | 12/2021 |
| JP | 7-281953 A | 10/1995 |
| JP | 9-204403 A | 8/1997 |
| JP | 2013-537993 A | 10/2013 |
| JP | 2014-199583 A | 10/2014 |
| JP | 2015-500524 A | 1/2015 |
| JP | 2015-84222 A | 4/2015 |
| JP | 2017-151911 A | 8/2017 |
| JP | 2017-521753 A | 8/2017 |
| JP | 2017-187973 A | 10/2017 |
| JP | 2018-10698 A | 1/2018 |
| KR | 10-2017-0031830 A | 3/2017 |
| TW | 201723859 A | 7/2017 |
| TW | 201738731 A | 11/2017 |
| TW | 1637616 B | 10/2018 |
| TW | 202008170 A | 2/2020 |
| WO | WO 2005/116839 A1 | 12/2005 |
| WO | 2015/075837 A1 | 5/2015 |
| WO | 2016/100978 A1 | 6/2016 |
| WO | 2016/170632 A1 | 10/2016 |
| WO | WO 2018/141061 A1 | 8/2018 |
| WO | 2019/050411 A1 | 3/2019 |

OTHER PUBLICATIONS

US Office Action dated Dec. 7, 2023, issued in U.S. Appl. No. 17/950,925 (12 pages).

US Notice of Allowance dated Jan. 23, 2024, issued in U.S. Appl. No. 17/026,082 (9 pages).

US Final Office Action dated Feb. 9, 2024, issued in U.S. Appl. No. 17/135,901 (11 pages).

US Notice of Allowance dated Feb. 28, 2024, issued in U.S. Appl. No. 17/026,082 (8 pages).

European Search Report for EP Application No. 21162578.5 dated Sep. 15, 2021, 13 pages.

Notice of Allowance for U.S. Appl. No. 17/026,082 dated Mar. 30, 2022, 7 pages.

Notice of Allowance for U.S. Appl. No. 17/026,087 dated Jun. 1, 2022, 8 pages.

Office Action for U.S. Appl. No. 17/026,071 dated Mar. 17, 2022, 14 pages.

Office Action for U.S. Appl. No. 17/026,082 dated Nov. 26, 2021, 13 pages.

Office Action for U.S. Appl. No. 17/246,448 dated May 13, 2022, 12 pages.

U.S. Advisory Action dated Dec. 9, 2021, issued in U.S. Appl. No. 17/026,071 (4 pages).

U.S. Office Action dated Dec. 15, 2021, issued in U.S. Appl. No. 17/026,087 (11 pages).

Jack Tigar Humphries, et al., "Mind the Gap: A Case for Informed Request Scheduling at the NIC", HotNets '19: Proceedings of the 18th ACM Workshop on Hot Topics in Networks, Nov. 2019, pp. 60-68, https://doi.org/10.1145/3365609.3365856.

EPO Extended European Search Report dated Sep. 13, 2021, issued in corresponding European Patent Application No. 21158607.8 (14 pages).

U.S. Final Office Action dated Sep. 28, 2021, issued in U.S. Appl. No. 17/026,071 (13 pages).

AWS Summit, Seoul, Korea, 2017, 36 pages, https://www.slideshare.net/awskorea/aws-cloud-game-architecture?from—action=save), Amazon Web Services, Inc.

Unpublished U.S. Appl. No. 17/026,082, filed Sep. 18, 2020.

Unpublished U.S. Appl. No. 17/026,071, filed Sep. 18, 2020.

Unpublished U.S. Appl. No. 17/026,087, filed Sep. 18, 2020.

US Office Action dated Aug. 3, 2022, issued in U.S. Appl. No. 17/,026,082 (13 pages).

US Office Action dated Oct. 3, 2023, issued in U.S. Appl. No. 17/026,082 (12 pages).

Chinese Office Action dated Jul. 12, 2023, issued in corresponding Chinese Patent Application No. 202110472003.5 (7 pages).

EPO Office Action dated Jul. 17, 2023, issued in corresponding European Patent Application No. 21171532.1 (10 pages).

US Office Action dated Aug. 15, 2023, issued in U.S. Appl. No. 17/135,901 (11 pages).

US Office Action dated Mar. 29, 2023, issued in U.S. Appl. No. 17/950,925 (6 pages).

(56)                 References Cited

OTHER PUBLICATIONS

US Advisory Action dated Dec. 1, 2022, issued in U.S. Appl. No. 17/246,448 (3 pages).
US Notice of Allowance dated Jan. 19, 2023, issued in U.S. Appl. No. 17/246,448 (7 pages).
US Notice of Allowance dated Mar. 6, 2023, issued in U.S. Appl. No. 17/026,082 (6 pages).
US Notice of Allowance dated Feb. 8, 2023, issued in U.S. Appl. No. 17/026,071 (9 pages).
US Final Office Action dated Sep. 16, 2022, issued in U.S. Appl. No. 17/026,071 (14 pages).
US Final Office Action dated Sep. 19, 2022, issued in U.S. Appl. No. 17/246,448 (12 pages).
US Office Action dated May 22, 2024, issued in U.S. Appl. No. 17/135,901 (11 pages).
Korean Office Action dated Apr. 16, 2024, issued in Korean Patent Application No. 10-2021-0026299 (118 pages).
Taiwanese Office Action dated Jul. 16, 2024, issued in Taiwanese Patent Application No. 110118357 (13 pages).
US Office Action dated Jul. 30, 2024, issued in U.S. Appl. No. 17/026,082 (14 pages).
Taiwanese Examination Report for TW Application No. 11320779640 dated Jul. 31, 2024, 8 pages.
Taiwanese Office Action and Search Report for TW 11320910430 dated Sep. 4, 2024, 12 pages.
Taiwanese Office Action and Search Report for TW 11320903010 dated Sep. 2, 2024, 11 pages.
Office Action for U.S. Appl. No. 18/357,798 dated Sep. 25, 2024, 13 pages.
US Final Office Action dated Oct. 1, 2024, issued in U.S. Appl. No. 17/135,901, 12 pages.

US Notice of Allowance dated Dec. 5, 2024, issued in U.S. Appl. No. 17/026,071 (10 pages).
US Office Action dated Dec. 16, 2024, issued in U.S. Appl. No. 17/950,925 (12 pages).
US Final Office Action dated Jan. 8, 2025, issued in U.S. Appl. No. 18/357,798 (14 pages).
Japanese Office Action dated Apr. 1, 2025, issued in corresponding Japanese Application No. 2021-89584, 4 pages.
US Office Action dated Feb. 13, 2025, issued in U.S. Appl. No. 17/026,082 (15 pages).
US Office Action dated Feb. 24, 2025, issued in U.S. Appl. No. 17/246,448 (12 pages).
US Office Action dated Feb. 25, 2025, issued in U.S. Appl. No. 17/026,071 (14 pages).
Korean Notice of Allowance dated Mar. 10, 2025, issued in corresponding Korean Patent Application No. 10-2021-0026299 (8 pages).
US Office Action dated Jul. 8, 2025, issued in U.S. Appl. No. 17/246,448 (14 pages).
US Notice of Allowance dated Jul. 8, 2025, issued in U.S. Appl. No. 17/950,925 (5 pages).
US Final Office Action dated Jul. 24, 2025, issued in U.S. Appl. No. 17/026,071 (16 pages).
Yu, et al. "The Design and Implementation of Device which Dynamically Connects Storage and Computation", Computer Science, 2007 vol. 34 No. 7, Retrieved from the Internet <URL: https://www.cnki.net, pp. 131-133.
U.S. Notice of Allowance dated Oct. 16, 2025, issued in U.S. Appl. No. 17/026,071 (8 pages).
U.S. Office Action dated Dec. 3, 2025, issued in U.S. Appl. No. 18/919,270 (15 pages).
U.S. Final Office Action dated Apr. 8, 2026, issued in U.S. Appl. No. 18/919,270 (18 pages).

* cited by examiner

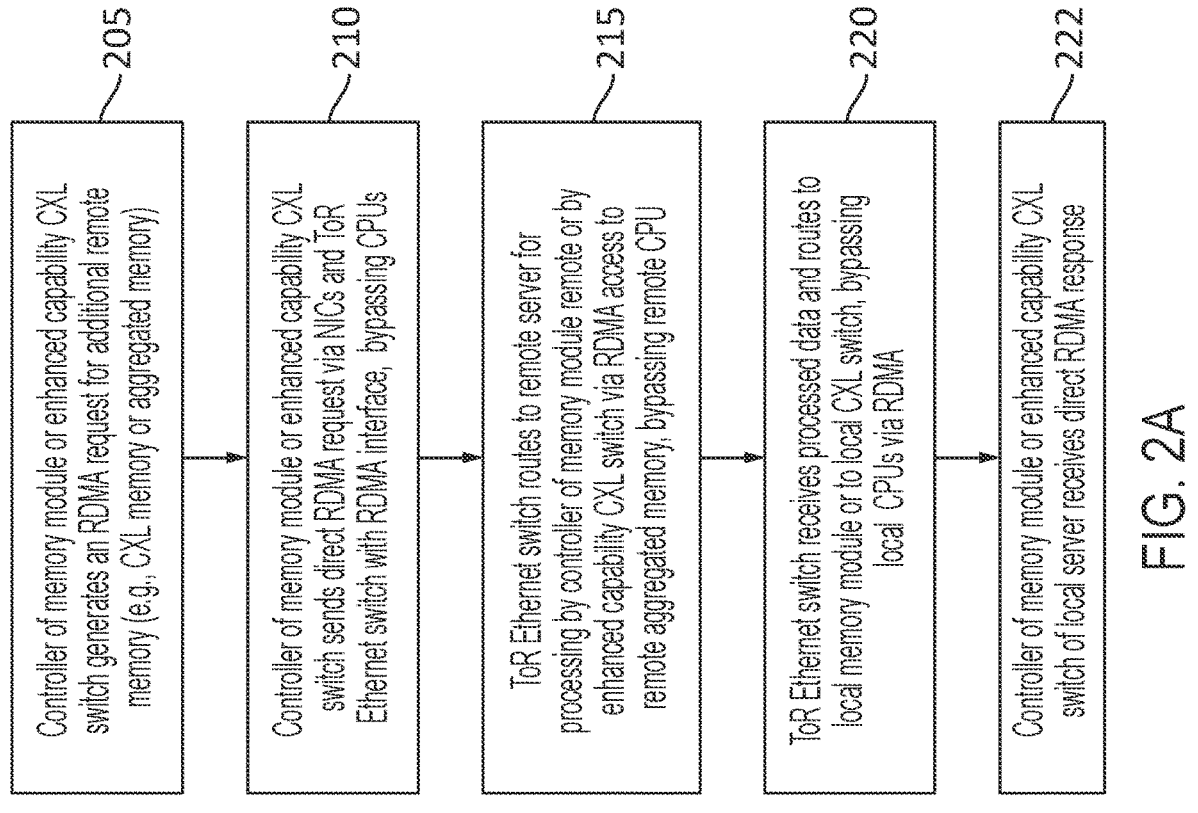

Controller of memory module or enhanced capability CXL switch generates an RDMA request for additional remote memory (e.g., CXL memory or aggregated memory) — 205

Controller of memory module or enhanced capability CXL switch sends direct RDMA request via NICs and ToR Ethernet switch with RDMA interface, bypassing CPUs — 210

ToR Ethernet switch routes to remote server for processing by controller of memory module remote or by enhanced capability CXL switch via RDMA access to remote aggregated memory, bypassing remote CPU — 215

ToR Ethernet switch receives processed data and routes to local memory module or to local CXL switch, bypassing local CPUs via RDMA — 220

Controller of memory module or enhanced capability CXL switch of local server receives direct RDMA response — 222

FIG. 2A

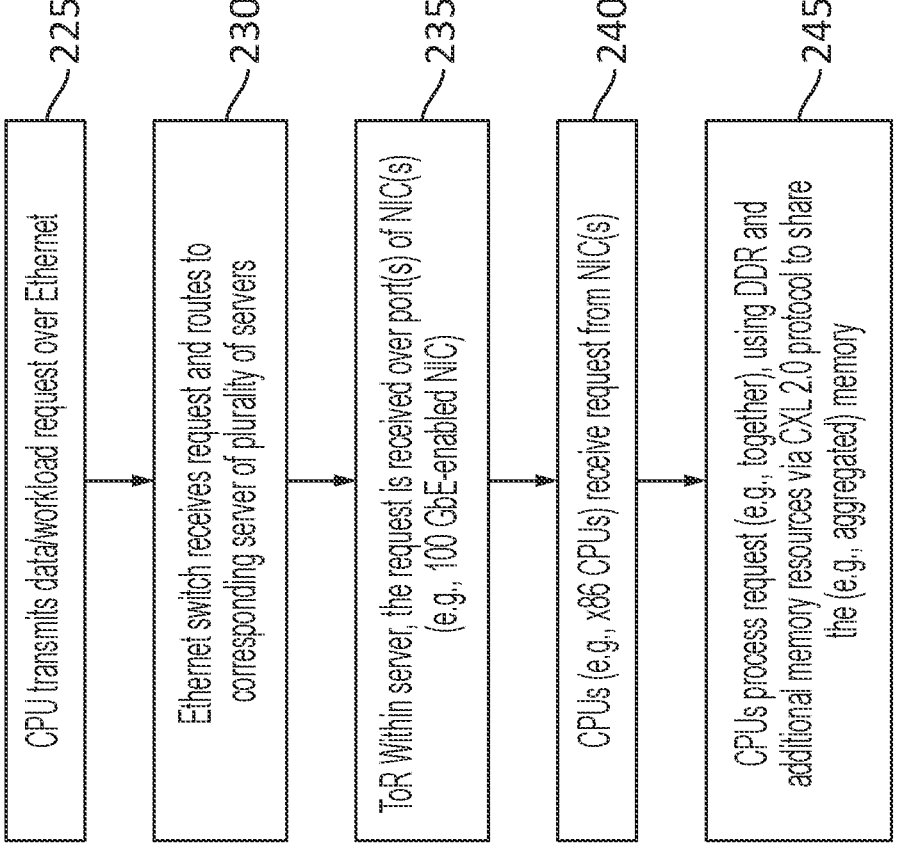

225  CPU transmits data/workload request over Ethernet

230  Ethernet switch receives request and routes to corresponding server of plurality of servers 235  ToR Within server, the request is received over port(s) of NIC(s) (e.g., 100 GbE-enabled NIC)

240  CPUs (e.g., x86 CPUs) receive request from NIC(s)

245  CPUs process request (e.g., together), using DDR and additional memory resources via CXL 2.0 protocol to share the (e.g., aggregated) memory

FIG. 2B

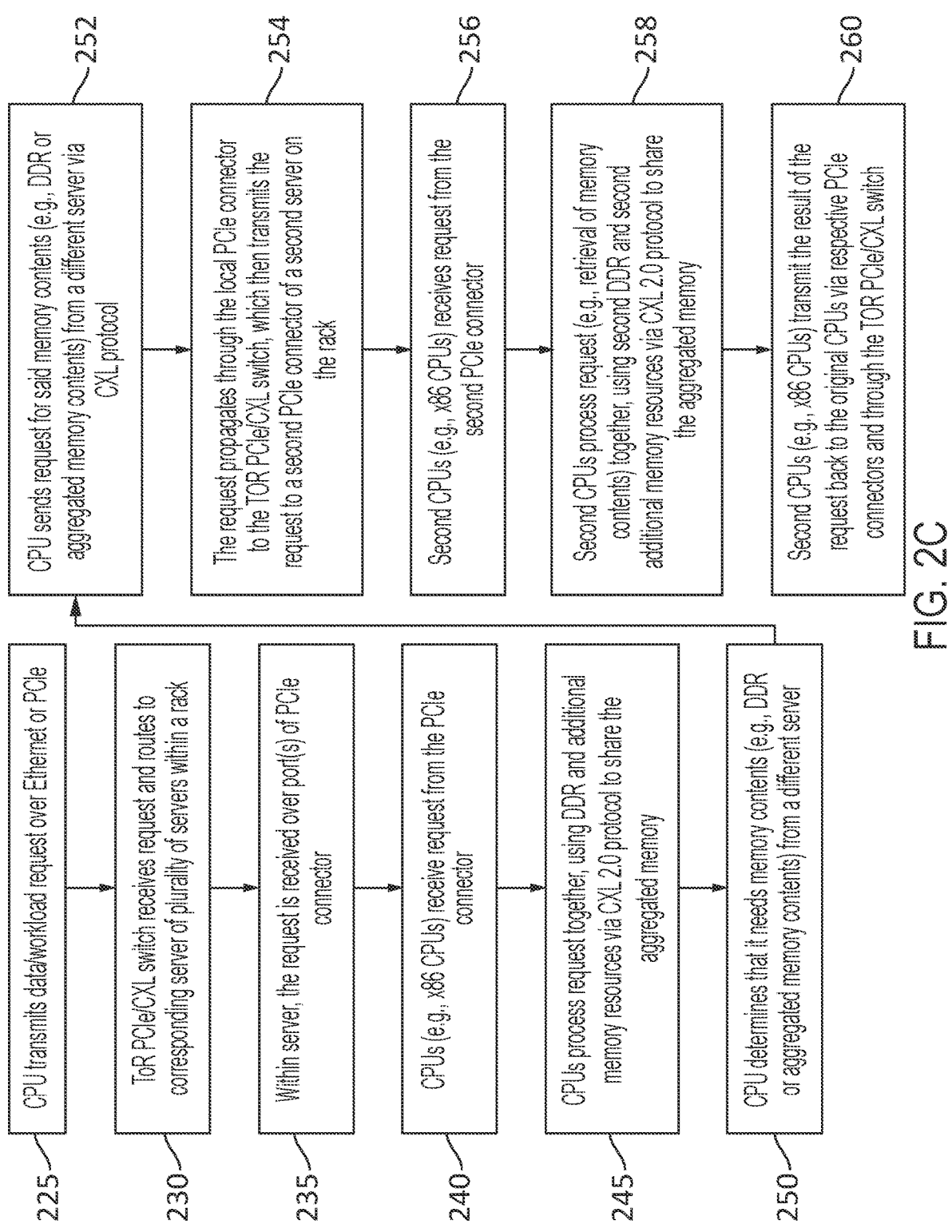

FIG. 2C

CPU transmits data/workload request over Ethernet or PCIe
225

TOR PCIe/CXL switch receives request and routes to corresponding server of plurality of servers within a rack
230

Within server, the request is received over port(s) of PCIe connector
235

CPUs (e.g., x86 CPUs) receive request from the PCIe connector
240

CPUs process request together, using DDR and additional memory resources via CXL 2.0 protocol to share the aggregated memory
245

CPU determines that it needs memory contents (e.g., DDR or aggregated memory contents) from a different server
250

CPU sends request for said memory contents (e.g., DDR or aggregated memory contents) from a different server via CXL protocol
252

The request propagates through the local PCIe connector to the TOR PCIe/CXL switch, which then transmits the request to a second PCIe connector of a second server on the rack
254

Second CPUs (e.g., x86 CPUs) receives request from the second PCIe connector
256

Second CPUs process request (e.g., retrieval of memory contents) together, using second DDR and second additional memory resources via CXL 2.0 protocol to share the aggregated memory
258

Second CPUs (e.g., x86 CPUs) transmit the result of the request back to the original CPUs via respective PCIe connectors and through the TOR PCIe/CXL switch
260

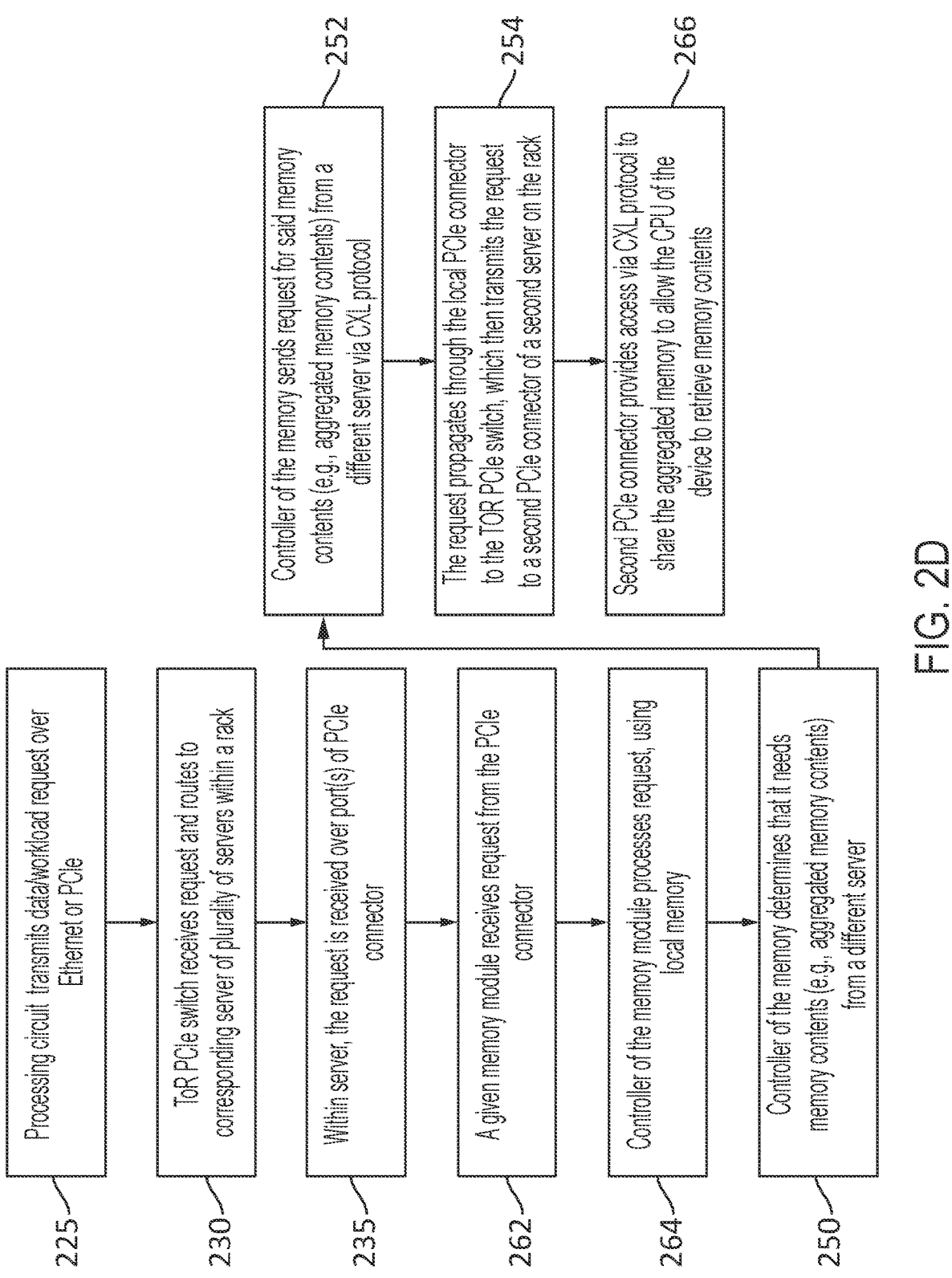

Processing circuit transmits data/workload request over Ethernet or PCIe — 225

ToR PCIe switch receives request and routes to corresponding server of plurality of servers within a rack — 230

Within server, the request is received over port(s) of PCIe connector — 235

A given memory module receives request from the PCIe connector — 262

Controller of the memory module processes request, using local memory — 264

Controller of the memory determines that it needs memory contents (e.g., aggregated memory contents) from a different server — 250

Controller of the memory sends request for said memory contents (e.g., aggregated memory contents) from a different server via CXL protocol — 252

The request propagates through the local PCIe connector to the TOR PCIe switch, which then transmits the request to a second PCIe connector of a second server on the rack — 254

Second PCIe connector provides access via CXL protocol to share the aggregated memory to allow the CPU of the device to retrieve memory contents — 266

FIG. 2D

SYSTEM WITH CACHE-COHERENT MEMORY AND SERVER-LINKING SWITCH

CROSS-REFERENCE TO RELATED APPLICATION(S)

This application is a continuation of U.S. patent application Ser. No. 17/887,379, filed Aug. 12, 2022, which is a continuation of U.S. patent application Ser. No. 17/026,074, filed Sep. 18, 2020, now U.S. Pat. No. 11,416,431, which claims priority to and the benefit of U.S. Provisional Application No. 63/031,508, filed May 28, 2020, entitled "EXTENDING MEMORY ACCESSES WITH NOVEL CACHE COHERENCE CONNECTS", and priority to and the benefit of U.S. Provisional Application No. 63/031,509, filed May 28, 2020, entitled "POOLING SERVER MEMORY RESOURCES FOR COMPUTE EFFI-CIENCY", and priority to and the benefit of U.S. Provisional Application No. 63/068,054, filed Aug. 20, 2020, entitled "SYSTEM WITH CACHE-COHERENT MEMORY AND SERVER-LINKING SWITCH FIELD", and priority to and the benefit of U.S. Provisional Application No. 63/057,746, filed Jul. 28, 2020, entitled "DISAGGREGATED MEMORY ARCHITECTURE WITH NOVEL INTER-CONNECTS", and priority to and the benefit of U.S. Pro-visional Application No. 63/006,073, filed Apr. 6, 2020, entitled "SYSTEMS, METHODS, AND APPARATUSES FOR MEMORY ACCESS USING CACHE COHERENT INTERCONNECTS", the entire contents of all which are incorporated herein by reference.

FIELD

One or more aspects of embodiments according to the present disclosure relate to computing systems, and more particularly to a system and method for managing memory resources in a system including one or more servers.

BACKGROUND

The present background section is intended to provide context only, and the disclosure of any embodiment or concept in this section does not constitute an admission that said embodiment or concept is prior art.

Some server systems may include collections of servers connected by a network protocol. Each of the servers in such a system may include processing resources (e.g., processors) and memory resources (e.g., system memory). It may be advantageous, in some circumstances, for a processing resource of one server to access a memory resource of another server, and it may be advantageous for this access to occur while minimizing the processing resources of either server.

Thus, there is a need for an improved system and method for managing memory resources in a system including one or more servers.

SUMMARY

In some embodiments, a data storage and processing system includes a plurality of servers connected by a server-linking switch. Each server may include one or more pro-cessing circuits, system memory, and one or more memory modules connected to the processing circuits through a cache-coherent switch. The cache coherent switch may be connected to the server-linking switch and it may include a controller (e.g., a field-programmable gate array (FPGA) or an application specific integrated circuit (ASIC)) providing it with enhanced capabilities. These capabilities may include virtualizing the memory modules, enabling the switch to store data in memory modules using an underlying technol-ogy well suited to the storage requirements (e.g., latency, bandwidth, or persistence) of the data being stored. The cache-coherent switch may receive the storage requirements as a result of these requirements having been transmitted to it by the processing circuits, or as a result of monitoring access patterns. The enhanced capabilities may further include enabling the server to interact with memory of another server without having to access a processor such as a central processing unit (CPU) (e.g., by performing remote direct memory access (RDMA)).

According to an embodiment of the present invention, there is provided a system, including: a first server, includ-ing: a stored-program processing circuit, a cache-coherent switch, and a first memory module; and a second server; and a server-linking switch connected to the first server and to the second server, wherein: the first memory module is connected to the cache-coherent switch, the cache-coherent switch is connected to the server-linking switch, and the stored-program processing circuit is connected to the cache-coherent switch.

In some embodiments, the server-linking switch includes a Peripheral Component Interconnect Express (PCIe) switch.

In some embodiments, the server-linking switch includes a Compute Express Link (CXL) switch.

In some embodiments, the server-linking switch includes a top of rack (ToR) CXL switch.

In some embodiments, the server-linking switch is con-figured to discover the first server.

In some embodiments, the server-linking switch is con-figured to cause the first server to reboot.

In some embodiments, the server-linking switch is con-figured to cause the cache-coherent switch to disable the first memory module.

In some embodiments, the server-linking switch is con-figured to transmit data from the second server to the first server, and to perform flow control on the data.

In some embodiments, the system further includes a third server connected to the server-linking switch, wherein: the server-linking switch is configured to: receive a first packet, from the second server, receive a second packet, from the third server, and transmit the first packet and the second packet to the first server.

In some embodiments, the system further includes a second memory module connected to the cache-coherent switch, wherein the first memory module includes volatile memory and the second memory module includes persistent memory.

In some embodiments, the cache-coherent switch is con-figured to virtualize the first memory module and the second memory module.

In some embodiments, the first memory module includes flash memory, and the cache-coherent switch is configured to provide a flash translation layer for the flash memory.

In some embodiments, the first server includes an expan-sion socket adapter, connected to an expansion socket of the first server, the expansion socket adapter including: the cache-coherent switch; and a memory module socket, the first memory module being connected to the cache-coherent switch through the memory module socket.

In some embodiments, the memory module socket includes an M.2 socket.

In some embodiments: the cache-coherent switch is connected to the server-linking switch through a connector, and the connector is on the expansion socket adapter.

According to an embodiment of the present invention, there is provided a method for performing remote direct memory access in a computing system, the computing system including: a first server, a second server, a third server, and a server-linking switch connected to the first server, to the second server, and to the third server, the first server including: a stored-program processing circuit, a cache-coherent switch, and a first memory module, the method including: receiving, by the server-linking switch, a first packet, from the second server, receiving, by the server-linking switch, a second packet, from the third server, and transmitting the first packet and the second packet to the first server.

In some embodiments, the method further includes: receiving, by the cache-coherent switch, a remote direct memory access (RDMA) request, and sending, by the cache-coherent switch, a RDMA response.

In some embodiments, the receiving of the RDMA request includes receiving the RDMA request through the server-linking switch.

In some embodiments, the method further includes: receiving, by the cache-coherent switch, a read command, from the stored-program processing circuit, for a first memory address, translating, by the cache-coherent switch, the first memory address to a second memory address, and retrieving, by the cache-coherent switch, data from the first memory module at the second memory address.

According to an embodiment of the present invention, there is provided a system, including: a first server, including: a stored-program processing circuit, cache-coherent switching means, a first memory module; and a second server; and a server-linking switch connected to the first server and to the second server, wherein: the first memory module is connected to the cache-coherent switching means, the cache-coherent switching means is connected to the server-linking switch, and the stored-program processing circuit is connected to the cache-coherent switching means.

BRIEF DESCRIPTION OF THE DRAWINGS

The drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 2A is a flow chart for an example method of performing a remote direct memory access (RDMA) transfer, bypassing processing circuits, for embodiments illustrated in FIGS. 1A-1G, according to an embodiment of the present disclosure;

FIG. 2B is a flow chart for an example method of performing an RDMA transfer, with the participation of processing circuits, for embodiments illustrated in FIGS. 1A-1D, according to an embodiment of the present disclosure;

FIG. 2C is a flow chart for an example method of performing an RDMA transfer, through a Compute Express Link (CXL) switch, for embodiments illustrated in FIGS. 1E and 1F, according to an embodiment of the present disclosure; and FIG. 2D is a flow chart for an example method of performing an RDMA transfer, through a CXL switch for the embodiment illustrated in FIG. 1G, according to an embodiment of the present disclosure.

DETAILED DESCRIPTION

Figure 1A:
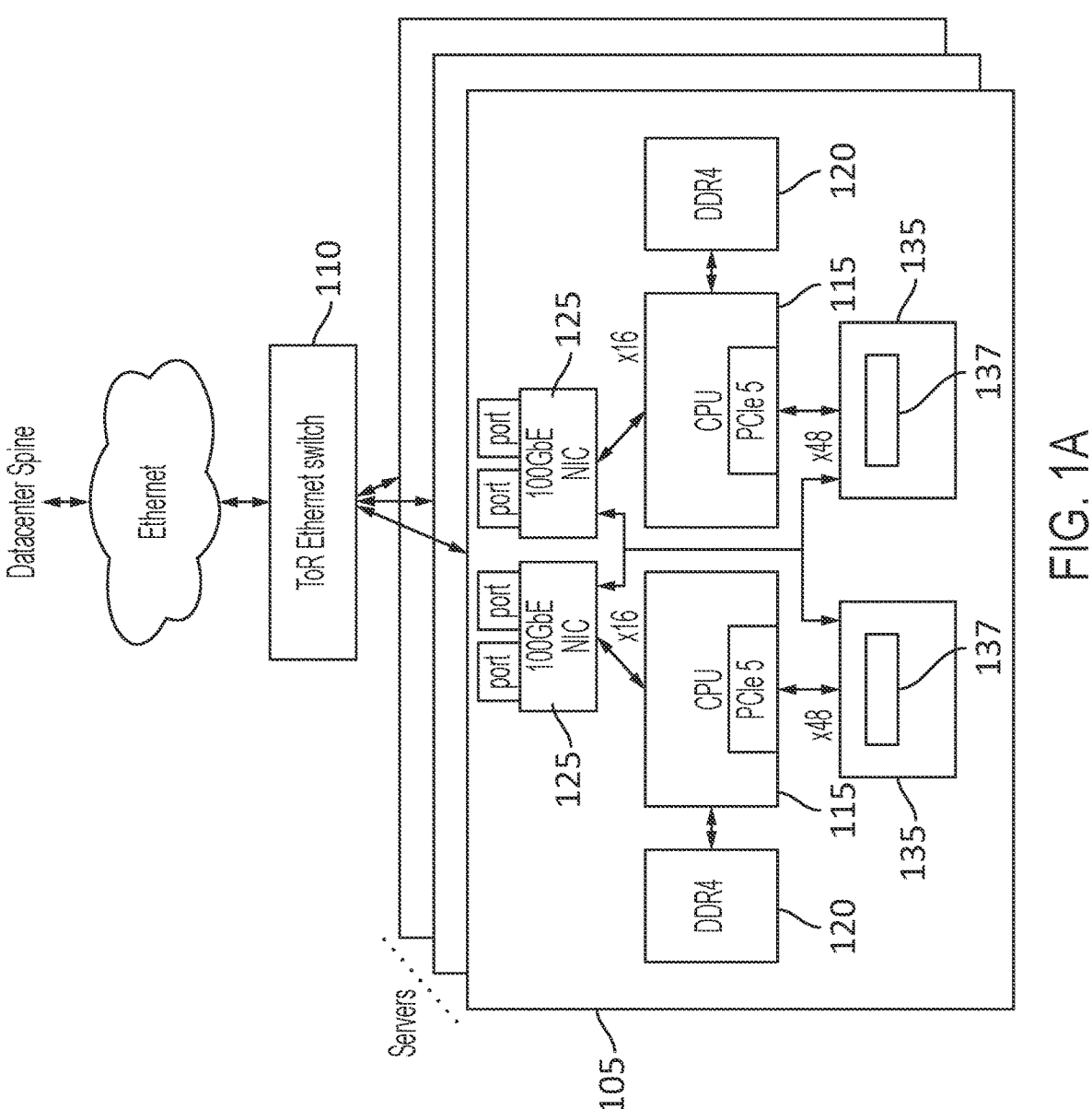
FIG. 1A is a block diagram of a system for attaching memory resources to computing resources using a cache-coherent connection, according to an embodiment of the present disclosure.

The detailed description set forth below in connection with the appended drawings is intended as a description of exemplary embodiments of a system and method for managing memory resources provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Peripheral Component Interconnect Express (PCIe) can refer to a computer interface which may have a relatively high and variable latency that can limit its usefulness in making connections to memory. CXL is an open industry standard for communications over PCIe 5.0, which can provide fixed, relatively short packet sizes, and, as a result, may be able to provide relatively high bandwidth and relatively low, fixed latency. As such, CXL may be capable of supporting cache coherence and CXL may be well suited for making connections to memory. CXL may further be used to provide connectivity between a host and accelerators, memory devices, and network interface circuits (or "network interface controllers" or network interface cards" (NICs)) in a server.

Cache coherent protocols such as CXL may also be employed for heterogeneous processing, e.g., in scalar, vector, and buffered memory systems. CXL may be used to leverage the channel, the retimers, the PHY layer of a system, the logical aspects of the interface, and the protocols from PCIe 5.0 to provide a cache-coherent interface. The CXL transaction layer may include three multiplexed sub-protocols that run simultaneously on a single link and can be referred to as CXL.io, CXL.cache, and CXL.memory. CXL.io may include I/O semantics, which may be similar to PCIe. CXL.cache may include caching semantics, and CXL.memory may include memory semantics; both the caching semantics and the memory semantics may be optional. Like PCIe, CXL may support (i) native widths of x16, x8, and x4, which may be partitionable, (ii) a data rate of 32 GT/s, degradable to 8 GT/s and 16 GT/s, 128b/130b, (iii) 300 W (75 W in a x16 connector), and (iv) plug and play. To support plug and play, either a PCIe or a CXL device link may start training in PCIe in Gen1, negotiate CXL, complete Gen 1-5 training and then start CXL transactions.

In some embodiments, the use of CXL connections to an aggregation, or "pool", of memory (e.g., a quantity of memory, including a plurality of memory cells connected together) may provide various advantages, in a system that includes a plurality of servers connected together by a network, as discussed in further detail below. For example, a CXL switch having further capabilities in addition to providing packet-switching functionality for CXL packets (referred to herein as an "enhanced capability CXL switch") may be used to connect the aggregation of memory to one or more central processing units (CPUs) (or "central processing circuits") and to one or more network interface circuits (which may have enhanced capability). Such a configuration may make it possible (i) for the aggregation of memory to include various types of memory, having different characteristics, (ii) for the enhanced capability CXL switch to virtualize the aggregation of memory, and to store data of different characteristics (e.g., frequency of access) in appropriate types of memory, (iii) for the enhanced capability CXL switch to support remote direct memory access (RDMA) so that RDMA may be performed with little or no involvement from the server's processing circuits. As used herein, to "virtualize" memory means to perform memory address translation between the processing circuit and the memory.

A CXL switch may (i) support memory and accelerator dis-aggregation through single level switching, (ii) enable resources to be off-lined and on-lined between domains, which may enable time-multiplexing across domains, based on demand, and (iii) support virtualization of downstream ports. CXL may be employed to implement aggregated memory, which may enable one-to-many and many-to-one switching (e.g., it may be capable of (i) connecting multiple root ports to one end point, (ii) connecting one root port to multiple end points, or (iii) connecting multiple root ports to multiple end points), with aggregated devices being, in some embodiments, partitioned into multiple logical devices each with a respective LD-ID (logical device identifier). In such an embodiment a physical device may be partitioned into a plurality of logical devices, each visible to a respective initiator. A device may have one physical function (PF) and a plurality (e.g., 16) isolated logical devices. In some embodiments the number of logical devices (e.g., the number of partitions) may be limited (e.g. to 16), and one control partition (which may be a physical function used for controlling the device) may also be present.

In some embodiments, a fabric manager may be employed to (i) perform device discovery and virtual CXL software creation, and to (ii) bind virtual ports to physical ports. Such a fabric manager may operate through connections over an SMBus sideband. The fabric manager may be implemented in hardware, or software, or firmware, or in a combination thereof, and it may reside, for example, in the host, in one of the memory modules 135, or in the enhanced capability CXL switch 130, or elsewhere in the network. The fabric manager may issue commands including commands issued through a sideband bus or through the PCIe tree.

Referring to FIG. 1A, in some embodiments, a server system includes a plurality of servers 105, connected together by a top of rack (ToR) Ethernet switch 110. While this switch is described as using Ethernet protocol, any other suitable network protocol may be used. Each server includes one or more processing circuits 115, each connected to (i) system memory 120 (e.g., Double Data Rate (version 4) (DDR4) memory or any other suitable memory), (ii) one or more network interface circuits 125, and (iii) one or more CXL memory modules 135. Each of the processing circuits 115 may be a stored-program processing circuit, e.g., a central processing unit (CPU (e.g., an x86 CPU), a graphics processing unit (GPU), or an ARM processor. In some embodiments a network interface circuit 125 may be embedded in (e.g., on the same semiconductor chip as, or in the same module as) one of the memory modules 135, or a network interface circuit 125 may be separately packaged from the memory modules 135.

As used herein, a "memory module" is a package (e.g., a package including a printed circuit board and components connected to it, or an enclosure including a printed circuit board) including one or more memory dies, each memory die including a plurality of memory cells. Each memory die, or each of a set of groups of memory dies, may be in a package (e.g., an epoxy mold compound (EMC) package) soldered to the printed circuit board of the memory module (or connected to the printed circuit board of the memory module through a connector). Each of the memory modules 135 may have a CXL interface and may include a controller 137 (e.g., an FPGA, an ASIC, a processor, and/or the like) for translating between CXL packets and the memory interface of the memory dies, e.g., the signals suitable for the memory technology of the memory in the memory module 135. As used herein, the "memory interface" of the memory dies is the interface that is native to the technology of the memory dies, e.g., in the case of DRAM e.g., the memory interface may be word lines and bit lines. A memory module may also include a controller 137 which may provide enhanced capabilities, as described in further detail below. The controller 137 of each memory modules 135 may be connected to a processing circuit 115 through a cache-coherent interface, e.g., through the CXL interface. The controller 137 may also facilitate data transmissions (e.g., RDMA requests) between different servers 105, bypassing the processing circuits 115. The ToR Ethernet switch 110 and the network interface circuits 125 may include an RDMA interface to facilitate RDMA requests between CXL memory devices on different servers (e.g., the ToR Ethernet switch 110 and the network interface circuits 125 may provide hardware offload or hardware acceleration of RDMA over Converged Ethernet (RoCE), Infiniband, and iWARP packets).

The CXL interconnects in the system may comply with a cache coherent protocol such as the CXL 1.1 standard, or, in some embodiments, with the CXL 2.0 standard, with a future version of CXL, or any other suitable protocol (e.g., cache coherent protocol). The memory modules 135 may be directly attached to the processing circuits 115 as shown, and the top of rack Ethernet switch 110 may be used for scaling the system to larger sizes (e.g., with larger numbers of servers 105).

In some embodiments, each server can be populated with multiple direct-attached CXL attached memory modules 135, as shown in FIG. 1A. Each memory module 135 may expose a set of base address registers (BARs) to the host's Basic Input/Output System (BIOS) as a memory range. One or more of the memory modules 135 may include firmware to transparently manage its memory space behind the host OS map. Each of the memory modules 135 may include one of, or a combination of, memory technologies including, for example (but not limited to) Dynamic Random Access Memory (DRAM), not-AND (NAND) flash, High Bandwidth Memory (HBM), and Low-Power Double Data Rate Synchronous Dynamic Random Access Memory (LPDDR SDRAM) technologies, and may also include a cache controller or separate respective split controllers for different technology memory devices (for memory modules 135 that combine several memory devices of different technologies). Each memory module 135 may include different interface widths (x4-x16), and may be constructed according to any of various pertinent form factors, e.g., U.2, M.2, half height, half length (HHHL), full height, half length (FHHL), E1.S, E1.L, E3.S, and E3.H.

In some embodiments, as mentioned above, the enhanced capability CXL switch 130 includes an FPGA (or ASIC) controller 137 and provides additional features beyond switching of CXL packets. The controller 137 of the enhanced capability CXL switch 130 may also act as a management device for the memory modules 135 and help with host control plane processing, and it may enable rich control semantics and statistics. The controller 137 may include an additional "backdoor" (e.g., 100 gigabit Ethernet (GbE)) network interface circuit 125. In some embodiments, the controller 137 presents as a CXL Type 2 device to the processing circuits 115, which enables the issuing of cache invalidate instructions to the processing circuits 115 upon receiving remote write requests. In some embodiments, DDIO technology is enabled, and remote data is first pulled to last level cache (LLC) of the processing circuit and later written to the memory modules 135 (from cache). As used herein, a "Type 2" CXL Device is one that can initiate transactions and that implements an optional coherent cache and host-managed device memory and for which applicable transaction types include all CXL.cache and all CXL.mem transactions.

As mentioned above, one or more of the memory modules 135 may include persistent memory, or "persistent storage" (i.e., storage within which data is not lost when external power is disconnected). If a memory module 135 is presented as a persistent device, the controller 137 of the memory module 135 may manage the persistent domain, e.g., it may store, in the persistent storage data identified (e.g., as a result of an application making a call to a corresponding operating system function) by a processing circuit 115 as requiring persistent storage. In such an embodiment, a software API may flush caches and data to the persistent storage.

In some embodiments, direct memory transfer to the memory modules 135 from the network interface circuits 125 is enabled. Such transfers may be a one-way transfers to remote memory for fast communication in a distributed system. In such an embodiment, the memory modules 135 may expose hardware details to the network interface circuits 125 in the system to enable faster RDMA transfers. In such a system, two scenarios may occur, depending on whether the Data Direct I/O (DDIO) of the processing circuit 115 is enabled or disabled. DDIO may enable direct communication between an Ethernet controller or an Ethernet adapter and a cache of a processing circuit 115. If the DDIO of the processing circuit 115 is enabled, the transfer's target may be the last level cache of the processing circuit, from which the data may subsequently be automatically flushed to the memory modules 135. If the DDIO of the processing circuit 115 is disabled, the memory modules 135 may operate in device-bias mode to force accesses to be directly received by the destination memory module 135 (without DDIO). An RDMA-capable network interface circuit 125 with host channel adapter (HCA), buffers, and other processing, may be employed to enable such an RDMA transfer, which may bypass the target memory buffer transfer that may be present in other modes of RDMA transfer. For example, in such an embodiment, the use of a bounce buffer (e.g., a buffer in the remote server, when the eventual destination in memory is in an address range not supported by the RDMA protocol) may be avoided. In some embodiments, RDMA uses another physical medium option, other than Ethernet (e.g., for use with a switch that is configured to handle other network protocols). Examples of inter-server connections that may enable RDMA include (but are not limited to) Infiniband, RDMA over Converged Ethernet (RoCE) (which uses Ethernet User Datagram Protocol (UDP)), and iWARP (which uses transmission control protocol/Internet protocol (TCP/IP)).

Figure 1B:
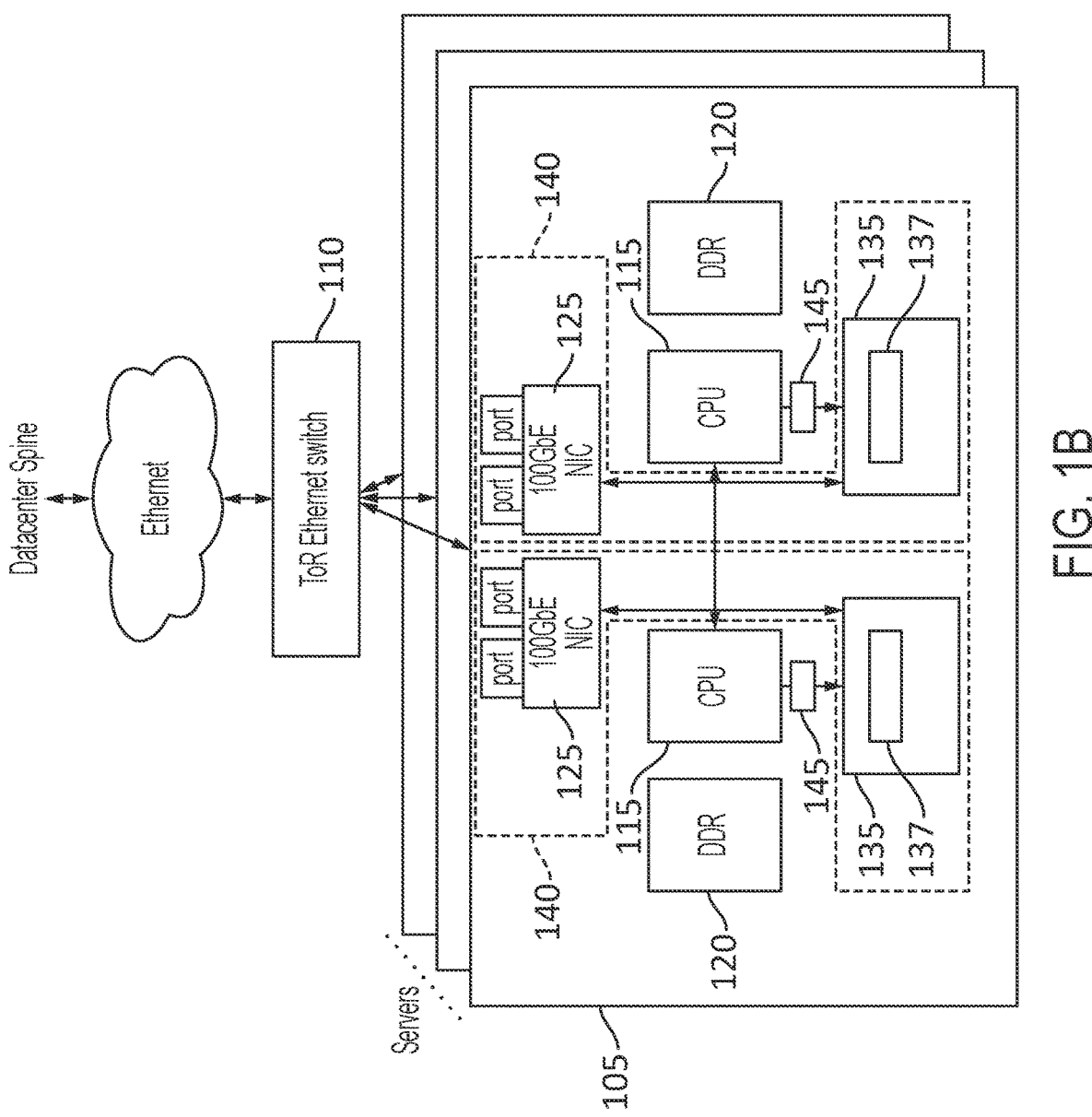
FIG. 1B is a block diagram of a system, employing expansion socket adapters, for attaching memory resources to computing resources using a cache-coherent connection, according to an embodiment of the present disclosure.

FIG. 1B shows a system similar to that of FIG. 1A, in which the processing circuits 115 are connected to the network interface circuits 125 through the memory modules 135. The memory modules 135 and the network interface circuits 125 are on expansion socket adapters 140. Each expansion socket adapter 140 may plug into an expansion socket 145, e.g., a M.2 connector, on the motherboard of the server 105. As such, the server may be any suitable (e.g., industry standard) server, modified by the installation of the expansion socket adapters 140 in expansion sockets 145. In such an embodiment, (i) each network interface circuit 125 may be integrated into a respective one of the memory modules 135, or (ii) each network interface circuit 125 may have a PCIe interface (the network interface circuit 125 may be a PCIe endpoint (i.e., a PCIe slave device)), so that the processing circuit 115 to which it is connected (which may operate as the PCIe master device, or "root port") may communicate with it through a root port to endpoint PCIe connection, and the controller 137 of the memory module 135 may communicate with it through a peer-to-peer PCIe connection.

According to an embodiment of the present invention, there is provided a system, including: a first server, including: a stored-program processing circuit, a first network interface circuit, and a first memory module, wherein: the first memory module includes: a first memory die, and a controller, the controller being connected: to the first memory die through a memory interface, to the stored-program processing circuit through a cache-coherent interface, and to the first network interface circuit. In some embodiments: the first memory module further includes a second memory die, the first memory die includes volatile memory, and the second memory die includes persistent memory. In some embodiments, the persistent memory includes NAND flash. In some embodiments, the controller is configured to provide a flash translation layer for the persistent memory. In some embodiments, the cache-coherent interface includes a Compute Express Link (CXL) interface. In some embodiments, the first server includes an expansion socket adapter, connected to an expansion socket of the first server, the expansion socket adapter including: the first memory module; and the first network interface circuit. In some embodiments, the controller of the first memory module is connected to the stored-program processing circuit through the expansion socket. In some embodiments, the expansion socket includes an M.2 socket. In some embodiments, the controller of the first memory module is connected to the first network interface circuit by a peer to peer Peripheral Component Interconnect Express (PCIe) connection. In some embodiments, the system further includes: a second server, and a network switch connected to the first server and to the second server. In some embodiments, the network switch includes a top of rack (ToR) Ethernet switch. In some embodiments, the controller of the first memory module is configured to receive straight remote direct memory access (RDMA) requests, and to send straight RDMA responses. In some embodiments, the controller of the first memory module is configured to receive straight remote direct memory access (RDMA) requests through the network switch and through the first network interface circuit, and to send straight RDMA responses through the network switch and through the first network interface circuit. In some embodiments, the controller of the first memory module is configured to: receive data, from the second server; store the data in the first memory module; and send, to the stored-program processing circuit, a command for invalidating a cache line. In some embodiments, the controller of the first memory module includes a field programmable gate array (FPGA) or an application-specific integrated circuit (ASIC). According to an embodiment of the present invention, there is provided a method for performing remote direct memory access in a computing system, the computing system including: a first server and a second server, the first server including: a stored-program processing circuit, a network interface circuit, and a first memory module including a controller, the method including: receiving, by the controller of the first memory module, a straight remote direct memory access (RDMA) request; and sending, by the controller of the first memory module, a straight RDMA response. In some embodiments: the computing system further includes an Ethernet switch connected to the first server and to the second server, and the receiving of the straight RDMA request includes receiving the straight RDMA request through the Ethernet switch. In some embodiments, the method further includes: receiving, by the controller of the first memory module, a read command, from the stored-program processing circuit, for a first memory address, translating, by the controller of the first memory module, the first memory address to a second memory address, and retrieving, by the controller of the first memory module, data from the first memory module at the second memory address. In some embodiments, the method further includes: receiving data, by the controller of the first memory module, storing, by the controller of the first memory module, the data in the first memory module, and sending, by the controller of the first memory module, to the stored-program processing circuit, a command for invalidating a cache line. According to an embodiment of the present invention, there is provided a system, including: a first server, including: a stored-program processing circuit, a first network interface circuit, and a first memory module, wherein: the first memory module includes: a first memory die, and controller means, the controller means being connected: to the first memory die through a memory interface, to the stored-program processing circuit through a cache-coherent interface, and to the first network interface circuit.

Figure 1C:
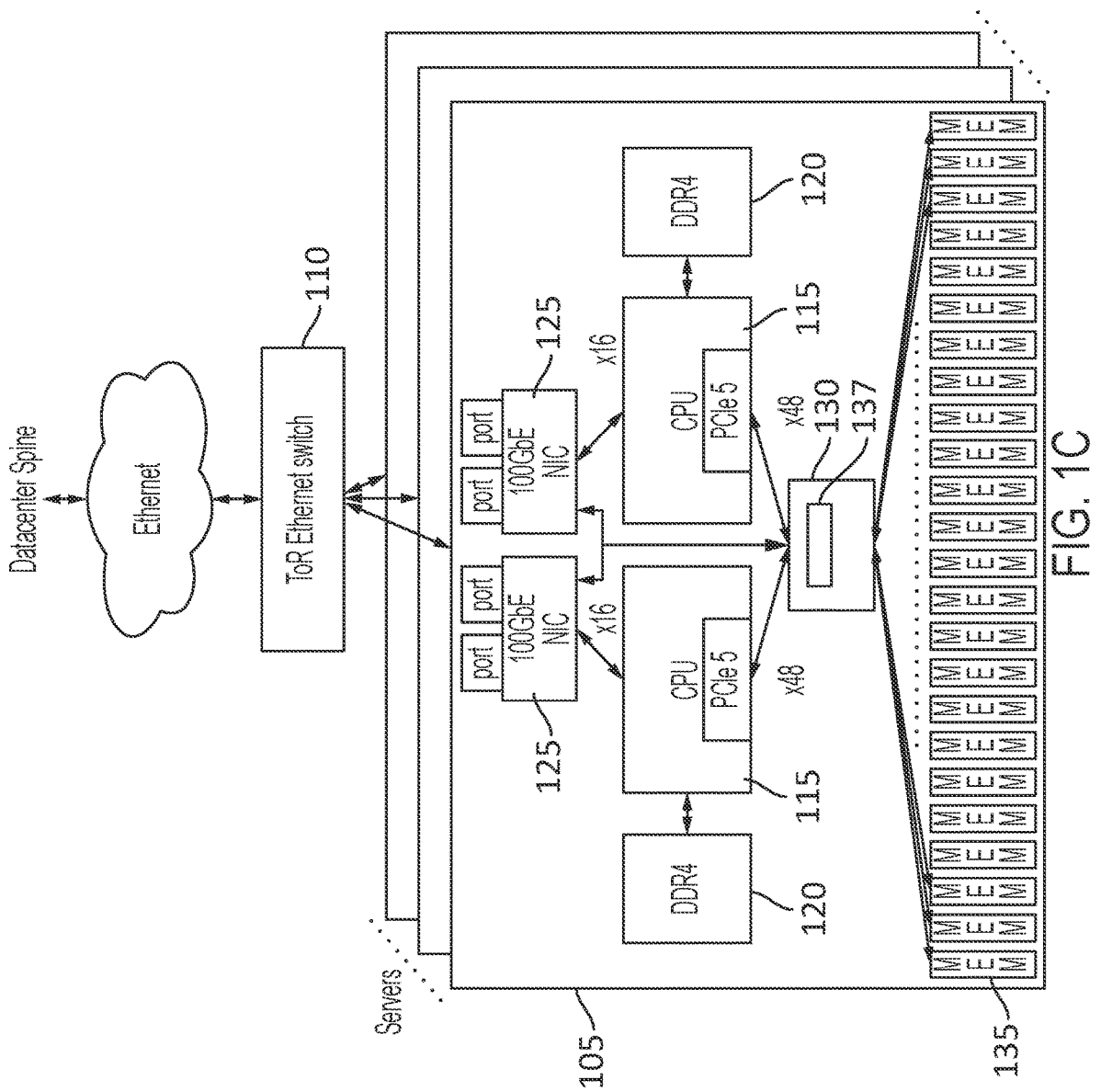
FIG. 1C is a block diagram of a system for aggregating memory employing an Ethernet ToR switch, according to an embodiment of the present disclosure.

Referring to FIG. 1C, in some embodiments, a server system includes a plurality of servers 105, connected together by a top of rack (ToR) Ethernet switch 110. Each server includes one or more processing circuits 115, each connected to (i) system memory 120 (e.g., DDR4 memory), (ii) one or more network interface circuits 125, and (iii) an enhanced capability CXL switch 130. The enhanced capability CXL switch 130 may be connected to a plurality of memory modules 135. That is, the system of FIG. 1C includes a first server 105, including a stored-program processing circuit 115, a network interface circuit 125, a cache-coherent switch 130, and a first memory module 135. In the system of FIG. 1C, the first memory module 135 is connected to the cache-coherent switch 130, the cache-coherent switch 130 is connected to the network interface circuit 125, and the stored-program processing circuit 115 is connected to the cache-coherent switch 130.

The memory modules 135 may be grouped by type, form factor, or technology type (e.g., DDR4, DRAM, LDPPR, high bandwidth memory (HBM), or NAND flash, or other persistent storage (e.g., solid state drives incorporating NAND flash)). Each memory module may have a CXL interface and include an interface circuit for translating between CXL packets and signals suitable for the memory in the memory module 135. In some embodiments, these interface circuits are instead in the enhanced capability CXL switch 130, and each of the memory modules 135 has an interface that is the native interface of the memory in the memory module 135. In some embodiments, the enhanced capability CXL switch 130 is integrated into (e.g., in an M.2 form factor package with, or integrated into a single integrated circuit with other components of) a memory module 135.

The ToR Ethernet switch 110 may include interface hardware to facilitate RDMA requests between aggregated memory devices on different servers. The enhanced capability CXL switch 130 may include one or more circuits (e.g., it may include an FPGA or an ASIC) to (i) route data to different memory types based on workload (ii) virtualize host addresses to device addresses and/or (iii) facilitate RDMA requests between different servers, bypassing the processing circuits 115.

The memory modules 135 may be in an expansion box (e.g., in the same rack as the enclosure housing the motherboard of the enclosure), which may include a predetermined number (e.g., more than 20 or more than 100) memory modules 135, each plugged into a suitable connector. The modules may be in an M.2 form factor, and the connectors may be M.2 connectors. In some embodiments, the connections between servers are over a different network, other than Ethernet, e.g., they may be wireless connections such as WiFi or 5G connections. Each processing circuit may be an x86 processor or another processor, e.g., an ARM processor or a GPU. The PCIe links on which the CXL links are instantiated may be PCIe 5.0 or another version (e.g., an earlier version or a later (e.g., future) version (e.g., PCIe 6.0). In some embodiments, a different cache-coherent protocol is used in the system instead of, or in addition to, CXL, and a different cache coherent switch may be used instead of, or in addition to, the enhanced capability CXL switch 130. Such a cache coherent protocol may be another standard protocol or a cache coherent variant of the standard protocol (in a manner analogous to the manner in which CXL is a variant of PCIe 5.0). Examples of standard protocols include, but are not limited to, non-volatile dual in-line memory module (version P) (NVDIMM-P), Cache Coherent Interconnect for Accelerators (CCIX), and Open Coherent Accelerator Processor Interface (OpenCAPI).

The system memory 120 may include, e.g., DDR4 memory, DRAM, HBM, or LDPPR memory. The memory modules 135 may be partitioned or contain cache controllers to handle multiple memory types. The memory modules 135 may be in different form factors, examples of which include but are not limited to HHHL, FHHL, M.2, U.2, mezzanine card, daughter card, E1.S, E1.L, E3.L, and E3.S.

In some embodiments, the system implements a aggregated architecture, including multiple servers, with each server aggregated with multiple CXL-attached memory modules 135. Each of the memory modules 135 may contain multiple partitions that can separately be exposed as memory devices to multiple processing circuits 115. Each input port of the enhanced capability CXL switch 130 may independently access multiple output ports of the enhanced capability CXL switch 130 and the memory modules 135 connected thereto. As used herein, an "input port" or "upstream port" of the enhanced capability CXL switch 130 is a port connected to (or suitable for connecting to) a PCIe root port, and an "output port" or "downstream port" of the enhanced capability CXL switch 130 is a port connected to (or suitable for connecting to) a PCIe endpoint. As in the case of the embodiment of FIG. 1A, each memory module 135 may expose a set of base address registers (BARs) to host BIOS as a memory range. One or more of the memory modules 135 may include firmware to transparently manage its memory space behind the host OS map.

In some embodiments, as mentioned above, the enhanced capability CXL switch 130 includes an FPGA (or ASIC) controller 137 and provides additional features beyond switching of CXL packets. For example, it may (as mentioned above) virtualize the memory modules 135, i.e., operate as a translation layer, translating between processing circuit-side addresses (or "processor-side" addresses, i.e., addresses that are included in memory read and write commands issued by the processing circuits 115) and memory-side addresses (i.e., addresses employed by the enhanced capability CXL switch 130 to address storage locations in the memory modules 135), thereby masking the physical addresses of the memory modules 135 and presenting a virtual aggregation of memory. The controller 137 of the enhanced capability CXL switch 130 may also act as a management device for the memory modules 135 and facilitate with host control plane processing. The controller 137 may transparently move data without the participation of the processing circuits 115 and accordingly update the memory map (or "address translation table") so that subsequent accesses function as expected. The controller 137 may contain a switch management device that (i) can bind and unbind the upstream and downstream connections during runtime as appropriate, and (iii) can enable rich control semantics and statistics associated with data transfers into and out of the memory modules 135. The controller 137 may include an additional "backdoor" 100 GbE or other network interface circuit 125 (in addition to the network interface used to connect to the host) for connecting to other servers 105 or to other networked equipment. In some embodiments, the controller 137 presents as a Type 2 device to the processing circuits 115, which enables the issuing of cache invalidate instructions to the processing circuits 115 upon receiving remote write requests. In some embodiments, DDIO technology is enabled, and remote data is first pulled to last level cache (LLC) of the processing circuit 115 and later written to the memory modules 135 (from cache).

As mentioned above, one or more of the memory modules 135 may include persistent storage. If a memory module 135 is presented as a persistent device, the controller 137 of the enhanced capability CXL switch 130 may manage the persistent domain (e.g., it may store, in the persistent storage, data identified (e.g., by the use of a corresponding operating system function) by a processing circuit 115 as requiring persistent storage. In such an embodiment, a software API may flush caches and data to the persistent storage.

In some embodiments, direct memory transfer to the memory modules 135 may be performed in a manner analogous to that described above for the embodiment of FIGS. 1A and 1B, with operations performed by the controllers of the memory modules 135 being, performed by the controller 137 of the enhanced capability CXL switch 130.

As mentioned above, in some embodiments, the memory modules 135 are organized into groups, e.g., into one group which is memory intensive, another group which is HBM heavy, another group which has limited density and performance, and another group that has a dense capacity. Such groups may have different form factors or be based on different technologies. The controller 137 of the enhanced capability CXL switch 130 may route data and commands intelligently based on, for example, a workload, a tagging, or a quality of service (QoS). For read requests, there may be no routing based on such factors.

The controller 137 of the enhanced capability CXL switch 130 may also (as mentioned above) virtualize the processing-circuit-side addresses and memory-side addresses, making it possible for the controller 137 of the enhanced capability CXL switch 130 to determine where data is to be stored. The controller 137 of the enhanced capability CXL switch 130 may make such a determination based on information or instructions it may receive from a processing circuit 115. For example, the operating system may provide a memory allocation feature making it possible for an application to specify that low-latency storage, or high bandwidth storage, or persistent storage is to be allocated, and such a request, initiated by the application, may then be taken into account by the controller 137 of the enhanced capability CXL switch 130 in determining where (e.g. in which of the memory modules 135) to allocate the memory. For example, storage for which high bandwidth is requested by the application may be allocated in memory modules 135 containing HBM, storage for which data persistence is requested by the application may be allocated in memory modules 135 containing NAND flash, and other storage (for which the application has made no requests) may be stored on memory modules 135 containing relatively inexpensive DRAM. In some embodiments, the controller 137 of the enhanced capability CXL switch 130 may make determinations about where to store certain data based on network usage patterns. For example, the controller 137 of the enhanced capability CXL switch 130 may determine, by monitoring usage patterns, that data in a certain range of physical addresses are being accessed more frequently than other data, and the controller 137 of the enhanced capability CXL switch 130 may then copy these data into a memory module 135 containing HBM, and modify its address translation table so that the data, in the new location, are stored in the same range of virtual addresses. In some embodiments one or more of the memory modules 135 includes flash memory (e.g., NAND flash), and the controller 137 of the enhanced capability CXL switch 130 implements a flash translation layer for this flash memory. The flash translation layer may support overwriting of processor-side memory locations (by moving the data to a different location and marking the previous location of the data as invalid) and it may perform garbage collection (e.g., erasing a block, after moving, to another block, any valid data in the block, when the fraction of data in the block marked invalid exceeds a threshold).

In some embodiments, the controller 137 of the enhanced capability CXL switch 130 may facilitate a physical function (PF) to PF transfer. For example, if one of the processing circuits 115 needs to move data from one physical address to another (which may have the same virtual addresses; this fact need not affect the operation of the processing circuit 115), or if the processing circuit 115 needs to move data between two virtual addresses (which the processing circuit 115 would need to have) the controller 137 of the enhanced capability CXL switch 130 may supervise the transfer, without the involvement of the processing circuit 115. For example, the processing circuit 115 may send a CXL request, and data may be transmitted from one memory module 135 to another memory module 135 (e.g., the data may be copied from one memory module 135 to another memory module 135) behind the enhanced capability CXL switch 130 without going to the processing circuit 115. In this situation, because the processing circuit 115 initiated the CXL request, the processing circuit 115 may need to flush its cache to ensure consistency. If instead a Type 2 memory device (e.g., one of the memory modules 135, or an accelerator that may also be connected to the CXL switch) initiates the CXL request and the switch is not virtualized, then the Type 2 memory device may send a message to the processing circuit 115 to invalidate the cache.

In some embodiments, the controller 137 of the enhanced capability CXL switch 130 may facilitate RDMA requests between servers. A remote server 105 may initiate such an RDMA request, and the request may be sent through the ToR Ethernet switch 110, and arrive at the enhanced capability CXL switch 130 in the server 105 responding to the RDMA request (the "local server"). The enhanced capability CXL switch 130 may be configured to receive such an RDMA request and it may treat a group of memory modules 135 in the receiving server 105 (i.e., the server receiving the RDMA request) as its own memory space. In the local server, the enhanced capability CXL switch 130 may receive the RDMA request as a direct RDMA request (i.e., an RDMA request that is not routed through a processing circuit 115 in the local server) and it may send a direct response to the RDMA request (i.e., it may send the response without it being routed through a processing circuit 115 in the local server). In the remote server, the response (e.g., data sent by the local server) may be received by the enhanced capability CXL switch 130 of the remote server, and stored in the memory modules 135 of the remote server, without being routed through a processing circuit 115 in the remote server.

Figure 1D:
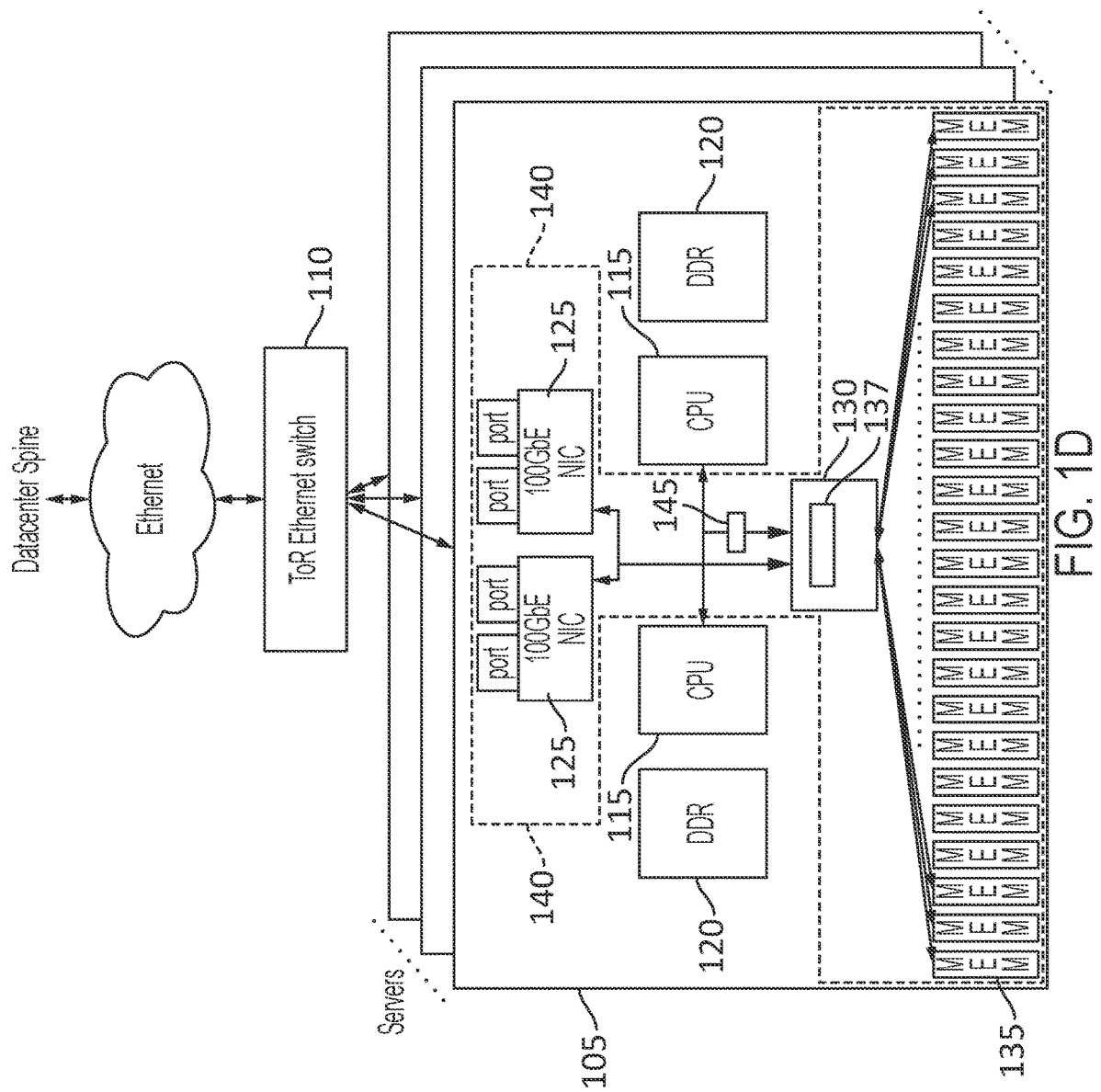
FIG. 1D is a block diagram of a system for aggregating memory employing an Ethernet ToR switch and an expansion socket adapter, according to an embodiment of the present disclosure.

FIG. 1D shows a system similar to that of FIG. 1C, in which the processing circuits 115 are connected to the network interface circuits 125 through the enhanced capability CXL switch 130. The enhanced capability CXL switch 130, the memory modules 135, and the network interface circuits 125 are on an expansion socket adapter 140. The expansion socket adapter 140 may be a circuit board or module that plugs into an expansion socket, e.g., a PCIe connector 145, on the motherboard of the server 105. As such, the server may be any suitable server, modified only by the installation of the expansion socket adapter 140 in the PCIe connector 145. The memory modules 135 may be installed in connectors (e.g., M.2 connectors) on the expansion socket adapter 140. In such an embodiment, (i) the network interface circuits 125 may be integrated into the enhanced capability CXL switch 130, or (ii) each network interface circuit 125 may have a PCIe interface (the network interface circuit 125 may be a PCIe endpoint), so that the processing circuit 115 to which it is connected may communicate with the network interface circuit 125 through a root port to endpoint PCIe connection. The controller 137 of the enhanced capability CXL switch 130 (which may have a PCIe input port connected to the processing circuit 115 and to the network interface circuits 125) may communicate with the network interface circuit 125 through a peer-to-peer PCIe connection.

According to an embodiment of the present invention, there is provided a system, including: a first server, including: a stored-program processing circuit, a network interface circuit, a cache-coherent switch, and a first memory module, wherein: the first memory module is connected to the cache-coherent switch, the cache-coherent switch is connected to the network interface circuit, and the stored-program processing circuit is connected to the cache-coherent switch. In some embodiments, the system further includes a second memory module connected to the cache-coherent switch, wherein the first memory module includes volatile memory and the second memory module includes persistent memory. In some embodiments, the cache-coherent switch is configured to virtualize the first memory module and the second memory module. In some embodiments, the first memory module includes flash memory, and the cache-coherent switch is configured to provide a flash translation layer for the flash memory. In some embodiments, the cache-coherent switch is configured to: monitor an access frequency of a first memory location in the first memory module; determine that the access frequency exceeds a first threshold; and copy the contents of the first memory location into a second memory location, the second memory location being in the second memory module. In some embodiments, the second memory module includes high bandwidth memory (HBM). In some embodiments, the cache-coherent switch is configured to maintain a table for mapping processor-side addresses to memory-side addresses. In some embodiments, the system further includes: a second server, and a network switch connected to first server and the the second server. In some embodiments, the network switch includes a top of rack (ToR) Ethernet switch. In some embodiments, the cache-coherent switch is configured to receive straight remote direct memory access (RDMA) requests, and to send straight RDMA responses. In some embodiments, the cache-coherent switch is configured to receive the remote direct memory access (RDMA) requests through the ToR Ethernet switch and through the network interface circuit, and to send straight RDMA responses through the ToR Ethernet switch and through the network interface circuit. In some embodiments, the cache-coherent switch is configured to support a Compute Express Link (CXL) protocol. In some embodiments, the first server includes an expansion socket adapter, connected to an expansion socket of the first server, the expansion socket adapter including: the cache-coherent switch; and a memory module socket, the first memory module being connected to the cache-coherent switch through the memory module socket. In some embodiments, the memory module socket includes an M.2 socket. In some embodiments, the network interface circuit is on the expansion socket adapter. According to an embodiment of the present invention, there is provided a method for performing remote direct memory access in a computing system, the computing system including: a first server and a second server, the first server including: a stored-program processing circuit, a network interface circuit, a cache-coherent switch, and a first memory module, the method including: receiving, by the cache-coherent switch, a straight remote direct memory access (RDMA) request, and sending, by the cache-coherent switch, a straight RDMA response. In some embodiments: the computing system further includes an Ethernet switch, and the receiving of the straight RDMA request includes receiving the straight RDMA request through the Ethernet switch. In some embodiments, the method further includes: receiving, by the cache-coherent switch, a read command, from the stored-program processing circuit, for a first memory address, translating, by the cache-coherent switch, the first memory address to a second memory address, and retrieving, by the cache-coherent switch, data from the first memory module at the second memory address. In some embodiments, the method further includes: receiving data, by the cache-coherent switch, storing, by the cache-coherent switch, the data in the first memory module, and sending, by the cache-coherent switch, to the stored-program processing circuit, a command for invalidating a cache line. According to an embodiment of the present invention, there is provided a system, including: a first server, including: a stored-program processing circuit, a network interface circuit, cache-coherent switching means, and a first memory module, wherein: the first memory module is connected to the cache-coherent switching means, the cache-coherent switching means is connected to the network interface circuit, and the stored-program processing circuit is connected to the cache-coherent switching means.

Figure 1E:
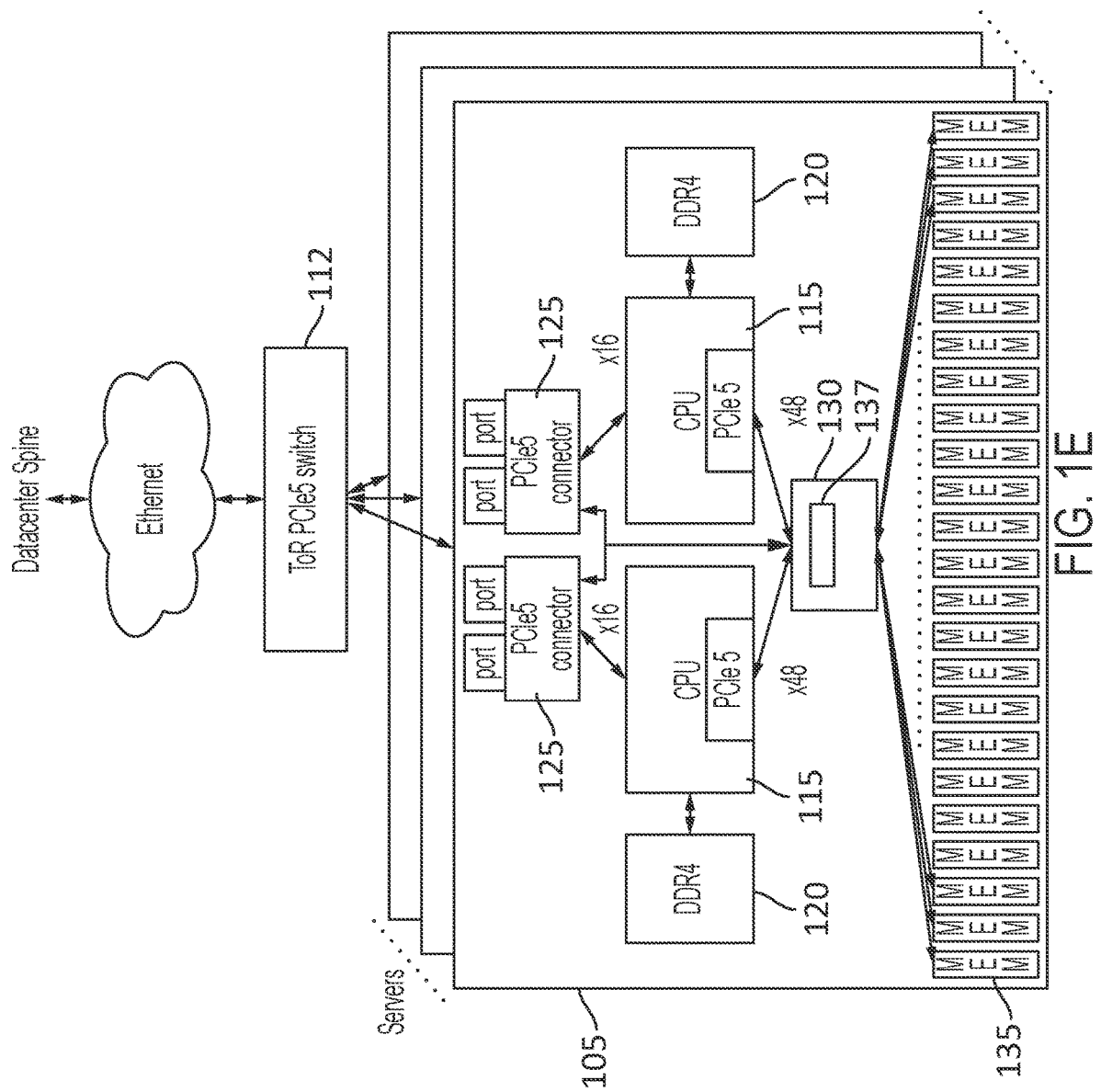
FIG. 1E is a block diagram of a system for aggregating memory, according to an embodiment of the present disclosure.

FIG. 1E shows an embodiment in which each of a plurality of servers 105 is connected to a ToR server-linking switch 112, which may be a PCIe 5.0 CXL switch, having PCIe capabilities, as illustrated. The server-linking switch 112 may include an FPGA or ASIC, and may provide performance (in terms of throughput and latency) superior to that of an Ethernet switch. Each of the servers 105 may include a plurality of memory modules 135 connected to the server-linking switch 112 through the enhanced capability CXL switch 130 and through a plurality of PCIe connectors. Each of the servers 105 may also include one or more processing circuits 115, and system memory 120, as shown. The server-linking switch 112 may operate as a master, and each of the enhanced capability CXL switches 130 may operate as a slave, as discussed in further detail below.

In the embodiment of FIG. 1E, the server-linking switch 112 may group or batch multiple cache requests received from different servers 105, and it may group packets, reducing control overhead. The enhanced capability CXL switch 130 may include a slave controller (e.g., a slave FPGA or a slave ASIC) to (i) route data to different memory types based on workload, (ii) virtualize processor-side addresses to memory-side addresses, and (iii) facilitate coherent requests between different servers 105, bypassing the processing circuits 115. The system illustrated in FIG. 1E may be CXL 2.0 based, it may include distributed shared memory within a rack, and it may use the ToR server-linking switch 112 to natively connect with remote nodes.

The ToR server-linking switch 112 may have an additional network connection (e.g., an Ethernet connection, as illustrated, or another kind of connection, e.g., a wireless connection such as a WiFi connection or a 5G connection) for making connections to other servers or to clients. The server-linking switch 112 and the enhanced capability CXL switch 130 may each include a controller, which may be or include a processing circuit such as an ARM processor. The PCIe interfaces may comply with the PCIe 5.0 standard or with an earlier version, or with a future version of the PCIe standard, or interfaces complying with a different standard (e.g., NVDIMM-P, CCIX, or OpenCAPI) may be employed instead of PCIe interfaces. The memory modules 135 may include various memory types including DDR4 DRAM, HBM, LDPPR, NAND flash, or solid state drives (SSDs). The memory modules 135 may be partitioned or contain cache controllers to handle multiple memory types, and they may be in different form factors, such as HHHL, FHHL, M.2, U.2, mezzanine card, daughter card, E1.S, E1.L, E3.L, or E3.S.

In the embodiment of FIG. 1E, the enhanced capability CXL switch 130 may enable one-to-many and many-to-one switching, and it may enable a fine grain load-store interface at the flit (64-byte) level. Each server may have aggregated memory devices, each device being partitioned into multiple logical devices each with a respective LD-ID. A ToR switch 112 (which may be referred to as a "server-linking switch" enables the one-to-many functionality, and the enhanced capability CXL switch 130 in the server 105 enables the many-to-one functionality. The server-linking switch 112 may be a PCIe switch, or a CXL switch, or both. In such a system, the requesters may be the processing circuits 115 of the multiple servers 105, the responders may be the many aggregated memory modules 135. The hierarchy of two switches (with the master switch being, as mentioned above, the server-linking switch 112, and the slave switch being the enhanced capability CXL switch 130) enables any-any communication. Each of the memory modules 135 may have one physical function (PF) and as many as 16 isolated logical devices. In some embodiments the number of logical devices (e.g., the number of partitions) may be limited (e.g. to 16), and one control partition (which may be a physical function used for controlling the device) may also be present. Each of the memory modules 135 may be a Type 2 device with cxl.cache, cxl.mem and cxl.io and address translation service (ATS) implementation to deal with cache line copies that the processing circuits 115 may hold. The enhanced capability CXL switch 130 and a fabric manager may control discovery of the memory modules 135 and (i) perform device discovery, and virtual CXL software creation, and (ii) bind virtual to physical ports. As in the embodiments of FIGS. 1A-1D, the fabric manager may operate through connections over an SMBus sideband. An interface to the memory modules 135, which may be Intelligent Platform Management Interface (IPMI) or an interface that complies with the Redfish standard (and that may also provide additional features not required by the standard), may enable configurability.

As mentioned above, some embodiments implement a hierarchical structure with a master controller (which may be implemented in an FPGA or in an ASIC) being part of the server-linking switch 112, and a slave controller being part of the enhanced capability CXL switch 130, to provide a load-store interface (i.e., an interface having cache-line (e.g., 64 byte) granularity and that operates within the coherence domain without software driver involvement). Such a load-store interface may extend the coherence domain beyond an individual server, or CPU or host, and may involve a physical medium that is either electrical or optical (e.g., an optical connection with electrical-to-optical transceivers at both ends). In operation, the master controller (in the server-linking switch 112) boots (or "reboots") and configures all the servers 105 on the rack. The master controller may have visibility on all the hosts, and it may (i) discover each server and discover how many servers 105 and memory modules 135 exist in the server cluster, (ii) configure each of the servers 105 independently, (iii) enable or disable some blocks of memory (e.g., enable or disable any of the memory modules 135) on different servers, based on, e.g., the configuration of the racks, (iv) control access (e.g., which server can control which other server), (v) implement flow control (e.g. it may, since all host and device requests go through the master, transmit data from the one server to another server, and perform flow control on the data), (vi) group or batch requests or packets (e.g., multiple cache requests being received by the master from different servers 105), and (vii) receive remote software updates, broadcast communications, and the like. In batch mode, the server-linking switch 112 may receive a plurality of packets destined for the same server (e.g., destined for a first server) and send them together (i.e., without a pause between them) to the first server. For example, server-linking switch 112 may receive a first packet, from a second server, and a second packet, from a third server, and transmit the first packet and the second packet, together, to the first server. Each of the servers 105 may expose, to the master controller, (i) an IPMI network interface, (ii) a system event log (SEL), and (iii) a board management controller (BMC), enabling the master controller to measure performance, to measure reliability on the fly, and to reconfigure the servers 105.

In some embodiments, a software architecture that facilitates a high availability load-store interface is used. Such a software architecture may provide reliability, replication, consistency, system coherence, hashing, caching, and persistence. The software architecture may provide reliability (in a system with a large number of servers), by performing periodic hardware checks of the CXL device components via IPMI. For example, the server-linking switch 112 may query a status of a memory server 150, through an IPMI interface, of the memory server 150, querying, for example, the power status (whether the power supplies of the memory server 150 are operating properly), the network status (whether the interface to the server-linking switch 112 is operating properly) and an error check status (whether an error condition is present in any of the subsystems of the memory server 150). The software architecture may provide replication, in that the master controller may replicate data stored in the memory modules 135 and maintain data consistency across replicas.

The software architecture may provide consistency in that the master controller may be configured with different consistency levels, and the server-linking switch 112 may adjust the packet format according to the consistency level to be maintained. For example, if eventual consistency is being maintained, the server-linking switch 112 may reorder the requests, while to maintain strict consistency, the server-linking switch 112 may maintain a scoreboard of all requests with precise timestamps at the switches. The software architecture may provide system coherence in that multiple processing circuits 115 may be reading from or writing to the same memory address, and the master controller may, to maintain coherence, be responsible for reaching the home node of the address (using a directory lookup) or broadcasting the request on a common bus.

The software architecture may provide hashing in that the server-linking switch 112 and the enhanced capability CXL switch may maintain a virtual mapping of addresses which may use consistent hashing with multiple hash functions to evenly map data to all CXL devices across all nodes at boot-up (or to adjust when one server goes down or comes up). The software architecture may provide caching in that the master controller may designate certain memory partitions (e.g., in a memory module 135 that includes HBM or a technology with similar capabilities) to act as cache (employing write-through caching or write-back caching, for example). The software architecture may provide persistence in that the master controller and the slave controller may manage persistent domains and flushes.

In some embodiments, the capabilities of the CXL switch are integrated into the controller of a memory module 135. In such an embodiment, the server-linking switch 112 may nonetheless act as a master and have enhanced features as discussed elsewhere herein. The server-linking switch 112 may also manage other storage devices in the system, and it may have an Ethernet connection (e.g., a 100 GbE connection), for connecting, e.g., to client machines that are not part of the PCIe network formed by the server-linking switch 112.

In some embodiments, the server-linking switch 112 has enhanced capabilities and also includes an integrated CXL controller. In other embodiments, the server-linking switch 112 is only a physical routing device, and each server 105 includes a master CXL controller. In such an embodiment, masters across different servers may negotiate a master-slave architecture. The intelligence functions of (i) the enhanced capability CXL switch 130 and of (ii) the server-linking switch 112 may be implemented in one or more FPGAs, one or more ASICs, one or more ARM processors, or in one or more SSD devices with compute capabilities. The server-linking switch 112 may perform flow control, e.g., by reordering independent requests. In some embodiments, because the interface is load-store, RDMA is optional but there may be intervening RDMA requests that use the PCIe physical medium (instead of 100 GbE). In such an embodiment, a remote host may initiate an RDMA request, which may be transmitted to the enhanced capability CXL switch 130 through the server-linking switch 112. The server-linking switch 112 and the enhanced capability CXL switch 130 may prioritize RDMA 4 KB requests, or CXL's flit (64-byte) requests.

As in the embodiment of FIGS. 1C and 1D, the enhanced capability CXL switch 130 may be configured to receive such an RDMA request and it may treat a group of memory modules 135 in the receiving server 105 (i.e., the server receiving the RDMA request) as its own memory space. Further, the enhanced capability CXL switch 130 may virtualize across the processing circuits 115 and initiate RDMA request on remote enhanced capability CXL switches 130 to move data back and forth between servers 105, without the processing circuits 115 being involved.

Figure 1F:
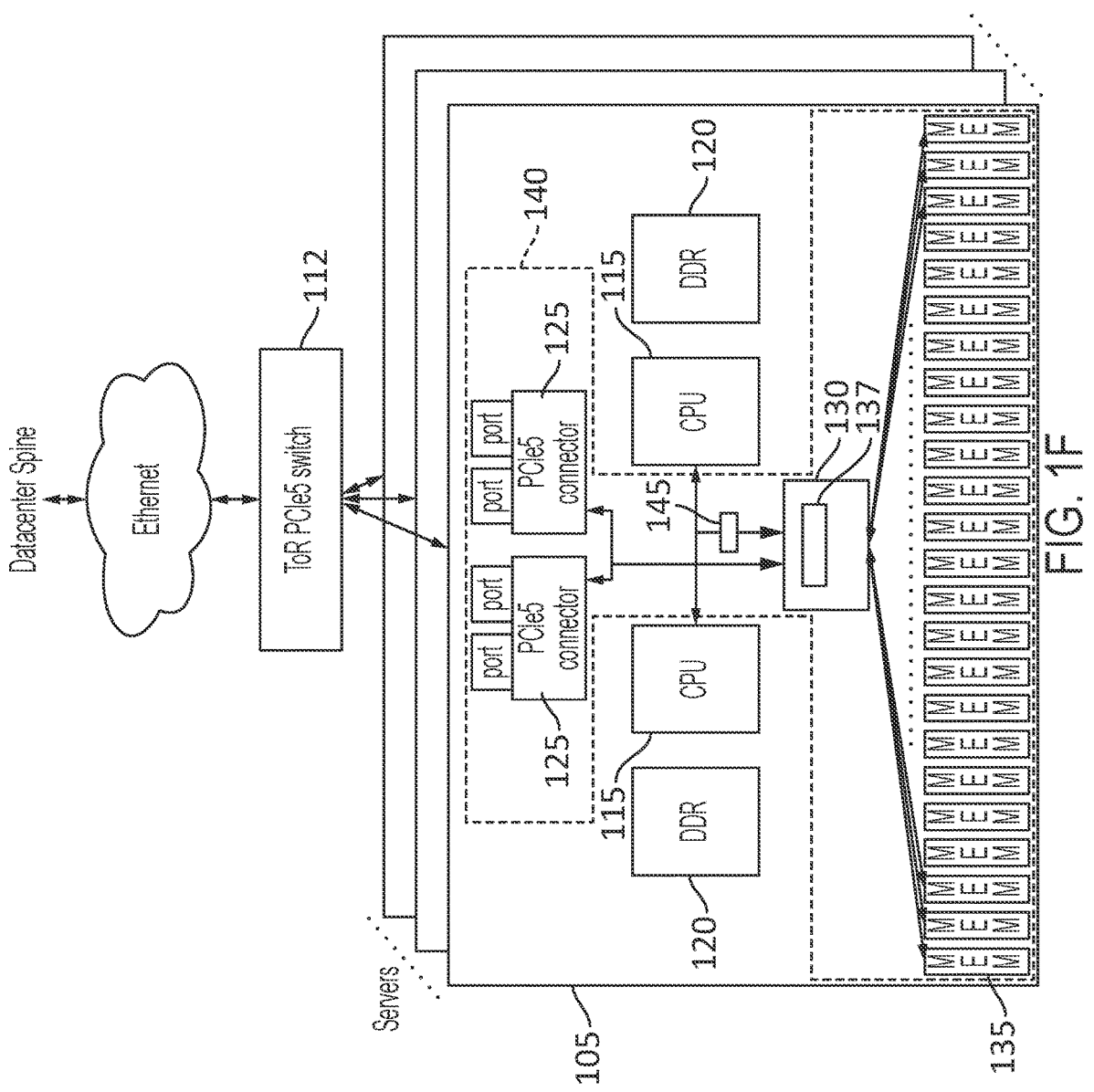
FIG. 1F is a block diagram of a system for aggregating memory, employing an expansion socket adapter, according to an embodiment of the present disclosure.

FIG. 1F shows a system similar to that of FIG. 1E, in which the processing circuits 115 are connected to the network interface circuits 125 through the enhanced capability CXL switch 130. As in the embodiment of FIG. 1D, in FIG. 1F the enhanced capability CXL switch 130, the memory modules 135, and the network interface circuits 125 are on an expansion socket adapter 140. The expansion socket adapter 140 may be a circuit board or module that plugs into an expansion socket, e.g., a PCIe connector 145, on the motherboard of the server 105. As such, the server may be any suitable server, modified only by the installation of the expansion socket adapter 140 in the PCIe connector 145. The memory modules 135 may be installed in connectors (e.g., M.2 connectors) on the expansion socket adapter 140. In such an embodiment, (i) the network interface circuits 125 may be integrated into the enhanced capability CXL switch 130, or (ii) each network interface circuit 125 may have a PCIe interface (the network interface circuit 125 may be a PCIe endpoint), so that the processing circuit 115 to which it is connected may communicate with the network interface circuit 125 through a root port to endpoint PCIe connection, and the controller 137 of the enhanced capability CXL switch 130 (which may have a PCIe input port connected to the processing circuit 115 and to the network interface circuits 125) may communicate with the network interface circuit 125 through a peer-to-peer PCIe connection.

According to an embodiment of the present invention, there is provided a system, including: a first server, including: a stored-program processing circuit, a cache-coherent switch, and a first memory module; and a second server; and a server-linking switch connected to the first server and to the second server, wherein: the first memory module is connected to the cache-coherent switch, the cache-coherent switch is connected to the server-linking switch, and the stored-program processing circuit is connected to the cache-coherent switch. In some embodiments, the server-linking switch includes a Peripheral Component Interconnect Express (PCIe) switch. In some embodiments, the server-linking switch includes a Compute Express Link (CXL) switch. In some embodiments, the server-linking switch includes a top of rack (ToR) CXL switch. In some embodiments, the server-linking switch is configured to discover the first server. In some embodiments, the server-linking switch is configured to cause the first server to reboot. In some embodiments, the server-linking switch is configured to cause the cache-coherent switch to disable the first memory module. In some embodiments, the server-linking switch is configured to transmit data from the second server to the first server, and to perform flow control on the data. In some embodiments, the system further includes a third server connected to the server-linking switch, wherein: the server-linking switch is configured to: receive a first packet, from the second server, receive a second packet, from the third server, and transmit the first packet and the second packet to the first server. In some embodiments, the system further includes a second memory module connected to the cache-coherent switch, wherein the first memory module includes volatile memory and the second memory module includes persistent memory. In some embodiments, the cache-coherent switch is configured to virtualize the first memory module and the second memory module. In some embodiments, the first memory module includes flash memory, and the cache-coherent switch is configured to provide a flash translation layer for the flash memory. In some embodiments, the first server includes an expansion socket adapter, connected to an expansion socket of the first server, the expansion socket adapter including: the cache-coherent switch; and a memory module socket, the first memory module being connected to the cache-coherent switch through the memory module socket. In some embodiments, the memory module socket includes an M.2 socket. In some embodiments: the cache-coherent switch is connected to the server-linking switch through a connector, and the connector is on the expansion socket adapter. According to an embodiment of the present invention, there is provided a method for performing remote direct memory access in a computing system, the computing system including: a first server, a second server, a third server, and a server-linking switch connected to the first server, to the second server, and to the third server, the first server including: a stored-program processing circuit, a cache-coherent switch, and a first memory module, the method including: receiving, by the server-linking switch, a first packet, from the second server, receiving, by the server-linking switch, a second packet, from the third server, and transmitting the first packet and the second packet to the first server. In some embodiments, the method further includes: receiving, by the cache-coherent switch, a straight remote direct memory access (RDMA) request, and sending, by the cache-coherent switch, a straight RDMA response. In some embodiments, the receiving of the straight RDMA request includes receiving the straight RDMA request through the server-linking switch. In some embodiments, the method further includes: receiving, by the cache-coherent switch, a read command, from the stored-program processing circuit, for a first memory address, translating, by the cache-coherent switch, the first memory address to a second memory address, and retrieving, by the cache-coherent switch, data from the first memory module at the second memory address. According to an embodiment of the present invention, there is provided a system, including: a first server, including: a stored-program processing circuit, cache-coherent switching means, a first memory module; and a second server; and a server-linking switch connected to the first server and to the second server, wherein: the first memory module is connected to the cache-coherent switching means, the cache-coherent switching means is connected to the server-linking switch, and the stored-program processing circuit is connected to the cache-coherent switching means.

Figure 1G:
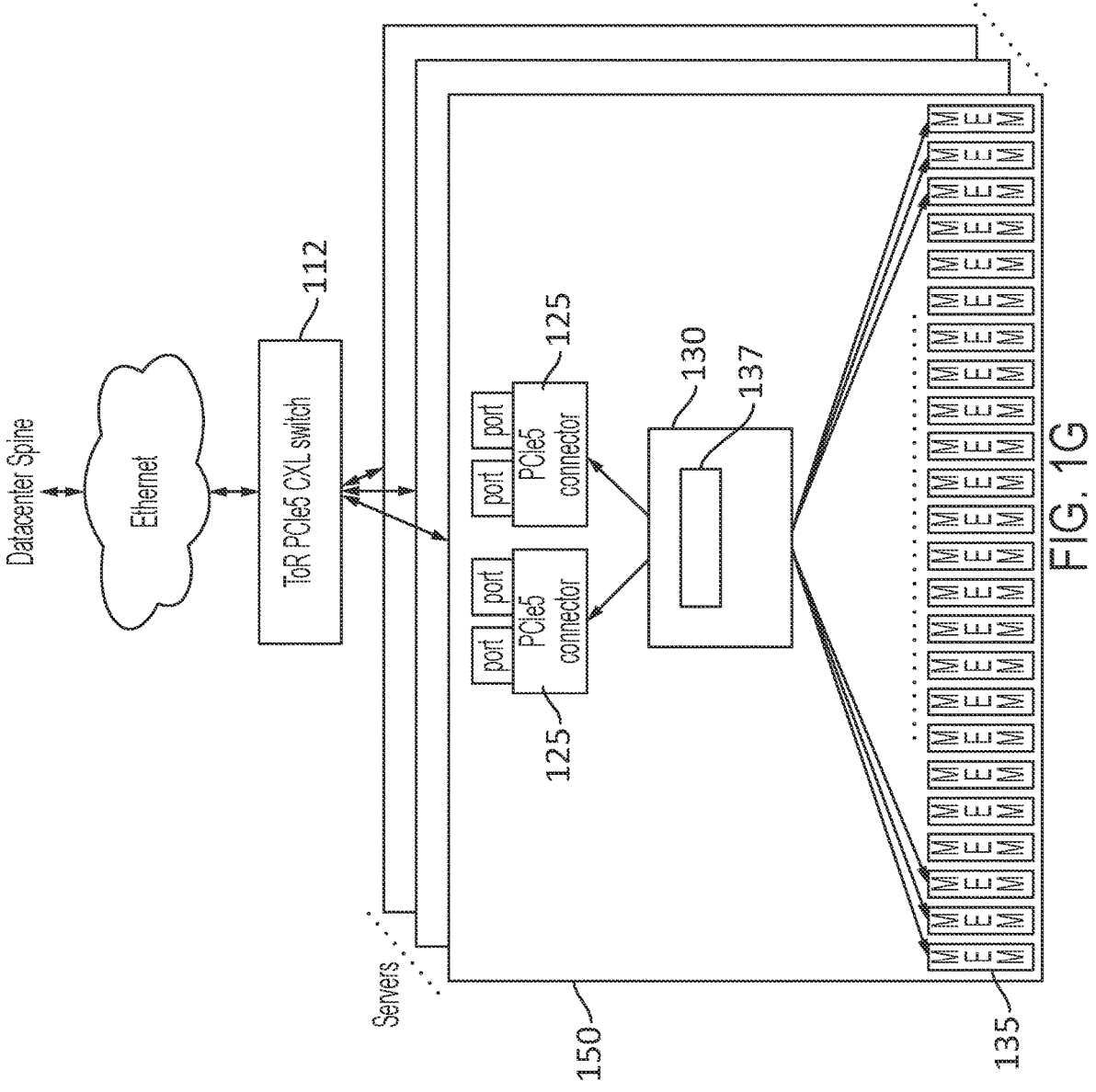
FIG. 1G is a block diagram of a system for disaggregating servers, according to an embodiment of the present disclosure.

FIG. 1G shows an embodiment in which each of a plurality of memory servers 150 is connected to a ToR server-linking switch 112, which may be a PCIe 5.0 CXL switch, as illustrated. As in the embodiment of FIGS. 1E and 1F, the server-linking switch 112 may include an FPGA or ASIC, and may provide performance (in terms of throughput and latency) superior to that of an Ethernet switch. As in the embodiment of FIGS. 1E and 1F, the memory server 150 may include a plurality of memory modules 135 connected to the server-linking switch 112 through a plurality of PCIe connectors. In the embodiment of FIG. 1G, the processing circuits 115 and system memory 120 may be absent, and the primary purpose of the memory server 150 may be to provide memory, for use by other servers 105 having computing resources.

In the embodiment of FIG. 1G, the server-linking switch 112 may group or batch multiple cache requests received from different memory servers 150, and it may group packets, reducing control overhead. The enhanced capability CXL switch 130 may include composable hardware building blocks to (i) route data to different memory types based on workload, and (ii) virtualize processor-side addresses (translating such addresses to memory-side addresses). The system illustrated in FIG. 1G may be CXL 2.0 based, it may include composable and disaggregated shared memory within a rack, and it may use the ToR server-linking switch 112 to provide pooled (i.e., aggregated) memory to remote devices.

The ToR server-linking switch 112 may have an additional network connection (e.g., an Ethernet connection, as illustrated, or another kind of connection, e.g., a wireless connection such as a WiFi connection or a 5G connection) for making connections to other servers or to clients. The server-linking switch 112 and the enhanced capability CXL switch 130 may each include a controller, which may be or include a processing circuit such as an ARM processor. The PCIe interfaces may comply with the PCIe 5.0 standard or with an earlier version, or with a future version of the PCIe standard, or a different standard (e.g., NVDIMM-P, CCIX, or OpenCAPI) may be employed instead of PCIe. The memory modules 135 may include various memory types including DDR4 DRAM, HBM, LDPPR, NAND flash, and solid state drives (SSDs). The memory modules 135 may be partitioned or contain cache controllers to handle multiple memory types, and they may be in different form factors, such as HHHL, FHHL, M.2, U.2, mezzanine card, daughter card, E1.S, E1.L, E3.L, or E3.S.

In the embodiment of FIG. 1G, the enhanced capability CXL switch 130 may enable one-to-many and many-to-one switching, and it may enable a fine grain load-store interface at the flit (64-byte) level. Each memory server 150 may have aggregated memory devices, each device being partitioned into multiple logical devices each with a respective LD-ID. The enhanced capability CXL switch 130 may include a controller 137 (e.g., an ASIC or an FPGA), and a circuit (which may be separate from, or part of, such an ASIC or FPGA) for device discovery, enumeration, partitioning, and presenting physical address ranges. Each of the memory modules 135 may have one physical function (PF) and as many as 16 isolated logical devices. In some embodiments the number of logical devices (e.g., the number of partitions) may be limited (e.g. to 16), and one control partition (which may be a physical function used for controlling the device) may also be present. Each of the memory modules 135 may be a Type 2 device with cxl.cache, cxl.mem and cxl.io and address translation service (ATS) implementation to deal with cache line copies that the processing circuits 115 may hold.

The enhanced capability CXL switch 130 and a fabric manager may control discovery of the memory modules 135 and (i) perform device discovery, and virtual CXL software creation, and (ii) bind virtual to physical ports. As in the embodiments of FIGS. 1A-1D, the fabric manager may operate through connections over an SMBus sideband. An interface to the memory modules 135, which may be Intelligent Platform Management Interface (IPMI) or an interface that complies with the Redfish standard (and that may also provide additional features not required by the standard), may enable configurability.

Building blocks, for the embodiment of FIG. 1G, may include (as mentioned above) a CXL controller 137 implemented on an FPGA or on an ASIC, switching to enable aggregating of memory devices (e.g., of the memory modules 135), SSDs, accelerators (GPUs, NICs), CXL and PCIe5 connectors, and firmware to expose device details to the advanced configuration and power interface (ACPI) tables of the operating system, such as the heterogeneous memory attribute table (HMAT) or the static resource affinity table SRAT.

In some embodiments, the system provides composability. The system may provide an ability to online and offline CXL devices and other accelerators based on the software configuration, and it may be capable of grouping accelerator, memory, storage device resources and rationing them to each memory server 150 in the rack. The system may hide the physical address space and provide transparent cache using faster devices like HBM and SRAM.

In the embodiment of FIG. 1G, the controller 137 of the enhanced capability CXL switch 130 may (i) manage the memory modules 135, (ii) integrate and control heterogeneous devices such as NICs, SSDs, GPUs, DRAM, and (iii) effect dynamic reconfiguration of storage to memory devices by power-gating. For example, the ToR server-linking switch 112 may disable power (i.e., shut off power, or reduce power) to one of the memory modules 135 (by instructing the enhanced capability CXL switch 130 to disable power to the memory module 135). The enhanced capability CXL switch 130 may then disable power to the memory module 135, upon being instructed, by the server-linking switch 112, to disable power to the memory module. Such disabling may conserve power, and it may improve the performance (e.g., the throughput and latency) of other memory modules 135 in the memory server 150. Each remote server 105 may see a different logical view of memory modules 135 and their connections based on negotiation. The controller 137 of the enhanced capability CXL switch 130 may maintain state so that each remote server maintains allotted resources and connections, and it may perform compression or deduplication of memory to save memory capacity (using a configurable chunk size). The disaggregated rack of FIG. 1G may have its own BMC. It also may expose an IPMI network interface and a system event log (SEL) to remote devices, enabling the master (e.g., a remote server using storage provided by the memory servers 150) to measure performance and reliability on the fly, and to reconfigure the disaggregated rack. The disaggregated rack of FIG. 1G may provide reliability, replication, consistency, system coherence, hashing, caching, and persistence, in a manner analogous to that described herein for the embodiment of FIG. 1E, with, e.g., coherence being provided with multiple remote servers reading from or writing to the same memory address, and with each remote server being configured with different consistency levels. In some embodiments, the server-linking switch maintains eventual consistency between data stored on a first memory server, and data stored on a second memory server. The server-linking switch 112 may maintain different consistency levels for different pairs of servers; for example, the server-linking switch may also maintain, between data stored on the first memory server, and data stored on a third memory server, a consistency level that is strict consistency, sequential consistency, causal consistency, or processor consistency. The system may employ communications in "local-band" (the server-linking switch 112) and "global-band" (disaggregated server) domains. Writes may be flushed to the "global band" to be visible to new reads from other servers. The controller 137 of the enhanced capability CXL switch 130 may manage persistent domains and flushes separately for each remote server. For example, the cache-coherent switch may monitor a fullness of a first region of memory (volatile memory, operating as a cache), and, when the fullness level exceeds a threshold, the cache-coherent switch may move data from the first region of memory to a second region of memory, the second region of memory being in persistent memory. Flow control may be handled in that priorities may be established, by the controller 137 of the enhanced capability CXL switch 130, among remote servers, to present different perceived latencies and bandwidths.

According to an embodiment of the present invention, there is provided a system, including: a first memory server, including: a cache-coherent switch, and a first memory module; and a second memory server; and a server-linking switch connected to the first memory server and to the second memory server, wherein: the first memory module is connected to the cache-coherent switch, and the cache-coherent switch is connected to the server-linking switch. In some embodiments, the server-linking switch is configured to disable power to the first memory module. In some embodiments: the server-linking switch is configured to disable power to the first memory module by instructing the cache-coherent switch to disable power to the first memory module, and the cache-coherent switch is configured to disable power to the first memory module, upon being instructed, by the server-linking switch, to disable power to the first memory module. In some embodiments, the cache-coherent switch is configured to perform deduplication within the first memory module. In some embodiments, the cache-coherent switch is configured to compress data and to store compressed data in the first memory module. In some embodiments, the server-linking switch is configured to query a status of the first memory server. In some embodiments, the server-linking switch is configured to query a status of the first memory server through an Intelligent Platform Management Interface (IPMI). In some embodiments, the querying of a status includes querying a status selected from the group consisting of a power status, a network status, and an error check status. In some embodiments, the server-linking switch is configured to batch cache requests directed to the first memory server. In some embodiments, the system further includes a third memory server connected to the server-linking switch, wherein the server-linking switch is configured to maintain, between data stored on the first memory server and data stored on the third memory server, a consistency level selected from the group consisting of strict consistency, sequential consistency, causal consistency, and processor consistency. In some embodiments, the cache-coherent switch is configured to: monitor a fullness of a first region of memory, and move data from the first region of memory to a second region of memory, wherein: the first region of memory is in volatile memory, and the second region of memory is in persistent memory. In some embodiments, the server-linking switch includes a Peripheral Component Interconnect Express (PCIe) switch. In some embodiments, the server-linking switch includes a Compute Express Link (CXL) switch. In some embodiments, the server-linking switch includes a top of rack (ToR) CXL switch. In some embodiments, the server-linking switch is configured to transmit data from the second memory server to the first memory server, and to perform flow control on the data. In some embodiments, the system further includes a third memory server connected to the server-linking switch, wherein: the server-linking switch is configured to: receive a first packet, from the second memory server, receive a second packet, from the third memory server, and transmit the first packet and the second packet to the first memory server. According to an embodiment of the present invention, there is provided a method for performing remote direct memory access in a computing system, the computing system including: a first memory server; a first server; a second server; and a server-linking switch connected to the first memory server, to the first server, and to the second server, the first memory server including: a cache-coherent switch, and a first memory module; the first server including: a stored-program processing circuit; the second server including: a stored-program processing circuit; the method including: receiving, by the server-linking switch, a first packet, from the first server; receiving, by the server-linking switch, a second packet, from the second server; and transmitting the first packet and the second packet to the first memory server. In some embodiments, the method further includes: compressing data, by the cache-coherent switch, and storing the data in the first memory module. In some embodiments, the method further includes: querying, by the server-linking switch, a status of the first memory server. According to an embodiment of the present invention, there is provided a system, including: a first memory server, including: a cache-coherent switch, and a first memory module; and a second memory server; and server-linking switching means connected to the first memory server and to the second memory server, wherein: the first memory module is connected to the cache-coherent switch, and the cache-coherent switch is connected to the server-linking switching means.

FIGS. 2A-2D are flow charts for various embodiments. In the embodiments of these flow charts, the processing circuits 115 are CPUs; in other embodiments they may be other processing circuits (e.g., GPUs). Referring to FIG. 2A, the controller 137 of a memory module 135 of the embodiment of FIGS. 1A and 1B, or the enhanced capability CXL switch 130 of any of the embodiments of FIGS. 1C-1G may virtualize across the processing circuit 115 and initiate an RDMA request on an enhanced capability CXL switch 130 in another server 105, to move data back and forth between servers 105, without involving a processing circuit 115 in either server (with the virtualization being handled by the controller 137 of the enhanced capability CXL switches 130). For example, at 205, the controller 137 of the memory module 135, or the enhanced capability CXL switch 130, generates an RDMA request for additional remote memory (e.g., CXL memory or aggregated memory); at 210, the network interface circuits 125 transmit the request to the ToR Ethernet switch 110 (which may have an RDMA interface), bypassing processing circuits; at 215, the ToR Ethernet switch 110 routes the RDMA request to the remote the server 105 for processing by the controller 137 of a memory module 135, or by a remote enhanced capability CXL switch 130, via RDMA access to remote aggregated memory, bypassing the remote processing circuit 115; at 220, the ToR Ethernet switch 110 receives the processed data and routes the data to the local memory module 135, or to the local enhanced capability CXL switch 130, bypassing the local processing circuits 115 via RDMA; and, at 222, the controller 137 of a memory module 135 of the embodiment of FIGS. 1A and 1B, or the enhanced capability CXL switch 130 receives the RDMA response straightly (e.g., without it being forwarded by the processing circuits 115).

In such an embodiment, the controller 137 of the remote memory module 135, or the enhanced capability CXL switch 130 of the remote the server 105, is configured to receive straight remote direct memory access (RDMA) requests and to send straight RDMA responses. As used herein, the controller 137 of the remote memory module 135 receiving, or the enhanced capability CXL switch 130 receiving, "straight RDMA requests" (or receiving such requests "straightly") means receiving, by the controller 137 of the remote memory module 135, or by the enhanced capability CXL switch 130, such requests without their being forwarded or otherwise processed by a processing circuit 115 of the remote server, and sending, by the controller 137 of the remote memory module 135, or by the enhanced capability CXL switch 130, "straight RDMA responses" (or sending such requests "straightly") means sending such responses without their being forwarded or otherwise processed by a processing circuit 115 of the remote server.

Referring to FIG. 2B, in another embodiment, RDMA may be performed with the processing circuit of the remote server being involved in the handling of the data. For example, at 225, a processing circuit 115 may transmit data or a workload request over Ethernet; at 230, the ToR Ethernet switch 110 may receive the request and route it to the corresponding server 105 of the plurality of servers 105; at 235, the request may be received, within the server, over port(s) of the network interface circuits 125 (e.g., 100 GbE-enabled NIC); at 240, the processing circuits 115 (e.g., x86 processing circuits) may receive the request from the network interface circuits 125; and, at 245, the processing circuits 115 may process the request (e.g., together), using DDR and additional memory resources via the CXL 2.0 protocol to share the memory (which, in the embodiment of FIGS. 1A and 1B, may be aggregated memory).

Referring to FIG. 2C, in the embodiment of FIG. 1E, RDMA may be performed with the processing circuit of the remote server being involved in the handling of the data. For example, at 225, a processing circuit 115 may transmit data or a workload request over Ethernet or PCie at 230, the ToR Ethernet switch 110 may receive the request and route it to the corresponding server 105 of the plurality of servers 105; at 235, the request may be received, within the server, over port(s) of the PCIe connector; at 240, the processing circuits 115 (e.g., x86 processing circuits) may receive the request from the network interface circuits 125; and, at 245, the processing circuits 115 may process the request (e.g., together), using DDR and additional memory resources via the CXL 2.0 protocol to share the memory (which, in the embodiment of FIGS. 1A and 1B, may be aggregated memory). At 250, the processing circuit 115 may identify a requirement to access memory contents (e.g., DDR or aggregated memory contents) from a different server; at 252 the processing circuit 115 may send the request for said memory contents (e.g., DDR or aggregated memory contents) from a different server, via a CXL protocol (e.g., CXL 1.1 or CXL 2.0); at 254, the request propagates through the local PCIe connector to the server-linking switch 112, which then transmits the request to a second PCIe connector of a second server on the rack; at 256, the second processing circuits 115 (e.g., x86 processing circuits) receive the request from the second PCIe connector; at 258, the second processing circuits 115 may process the request (e.g., retrieval of memory contents) together, using second DDR and second additional memory resources via the CXL 2.0 protocol to share the aggregated memory; and, at 260, the second processing circuits (e.g., x86 processing circuits) transmit the result of the request back to the original processing circuits via respective PCIe connectors and through the server-linking switch 112.

Referring to FIG. 2D, in the embodiment of FIG. 1G, RDMA may be performed with the processing circuit of the remote server being involved in the handling of the data. For example; at 225, a processing circuit 115 may transmit data or a workload request over Ethernet; at 230, the ToR Ethernet switch 110 may receive the request and route it to the corresponding server 105 of the plurality of servers 105; at 235, the request may be received, within the server, over port(s) of the network interface circuits 125 (e.g., 100 GbE-enabled NICs). At 262, a memory module 135 receives the request from the PCIe connector; at 264, the controller of the memory module 135 processes the request, using local memory; at 250, the controller of the memory module 135 identifies a requirement to access memory contents (e.g., aggregated memory contents) from a different server; at 252, the controller of the memory module 135 sends request for said memory contents (e.g., aggregated memory contents) from a different server via the CXL protocol; at 254 the request propagates through the local PCIe connector to the server-linking switch 112, which then transmits the request to a second PCIe connector of a second server on the rack; and at 266, the second PCIe connector provides access via the CXL protocol to share the aggregated memory to allow the controller of the memory module 135 to retrieve memory contents.

As used herein, a "server" is a computing system including at least one stored-program processing circuit (e.g., a processing circuit 115), at least one memory resource (e.g., a system memory 120), and at least one circuit for providing network connectivity (e.g., a network interface circuit 125). As used herein, "a portion of" something means "at least some of" the thing, and as such may mean less than all of, or all of, the thing. As such, "a portion of" a thing includes the entire thing as a special case, i.e., the entire thing is an example of a portion of the thing.

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

The term "processing circuit" or "controller means" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, a "controller" includes a circuit, and a controller may also be referred to as a "control circuit" or a "controller circuit". Similarly, a "memory module" may also be referred to as a "memory module circuit" or as a "memory circuit". As used herein, the term "array" refers to an ordered set of numbers regardless of how stored (e.g., whether stored in consecutive memory locations, or in a linked list). As used herein, when a second number is "within Y %" of a first number, it means that the second number is at least $(1-Y/100)$ times the first number and the second number is at most $(1+Y/100)$ times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of system and method for managing memory resources have been specifically described and illustrated herein, many modifications and variations will be apparent to those skilled in the art. Accordingly, it is to be understood that system and method for managing memory resources constructed according to principles of this disclosure may be embodied other than as specifically described herein. The invention is also defined in the following claims, and equivalents thereof.

What is claimed is:

1. A system, comprising:
a first computing device, comprising:
    a first switch including a processing device configured to adhere to a cache coherent protocol;
    a first memory device and a second memory device connected to the first switch, wherein the first memory device is associated with a first memory technology and the second memory device is associated with a second memory technology different from the first memory technology; and
a second switch connected to the first computing device, wherein:
    the second switch is configured to receive a first data request and a second data request, wherein the first data request and the second data request adhere to the cache coherent protocol,
    the processing device of the first switch is configured to:
        identify the first memory device based on the first data request;
        translate the first data request into a third data request based on the first memory technology, wherein the third data request adheres to a first memory protocol different from the cache coherent protocol;
        transmit the third data request to the first memory device for accessing the first memory device;
        identify the second memory device based on the second data request;
        translate the second data request to a fourth data request based on the second memory technology, wherein the fourth data request adheres to a second memory protocol different from the first memory protocol and the cache coherent protocol; and
        transmit the fourth data request to the second memory device for accessing the second memory device.

2. The system of claim 1, wherein the second switch is configured based on a storage protocol.

3. The system of claim 1, wherein the second switch is configured based on the cache coherent protocol.

4. The system of claim 3, wherein the second switch comprises a network switch configured based on the cache coherent protocol.

5. The system of claim 1, wherein the second switch is configured to discover the first computing device.

6. The system of claim 1, wherein the second switch is configured to cause the first computing device to reboot.

7. The system of claim 1, wherein the second switch is configured to cause the first switch to disable the first memory device.

8. The system of claim 1, wherein the second switch is configured to transmit the first data request from a second computing to the first computing device, and to perform flow control on data associated with the first data request.

9. The system of claim 1, further comprising a second computing device and a third computing device connected to the second switch, wherein:

the second switch is configured to:

receive a first packet associated with the first data request, from the second computing device;

receive a second packet, from the third computing device;

group the first packet and the second packet to generate a grouped packet; and transmit the grouped packet to the first computing device.

10. The system of claim 1, wherein the first memory device comprises volatile memory and the second memory device comprises persistent memory.

11. The system of claim 10, wherein the first switch is configured to virtualize the first memory device and the second memory device.

12. The system of claim 11, wherein the first memory device comprises flash memory, and the first switch is configured to provide a flash translation layer for the flash memory.

13. The system of claim 1, wherein the first switch is included in a circuit board connected to an interface of the first computing device, the circuit board further comprising a memory module interface, the first memory device being connected to the first switch via the memory module interface.

14. The system of claim 13, wherein the memory module interface is associated with a solid state drive.

15. The system of claim 13, wherein:

the first switch is connected to the second switch through a connector, and the connector is on the circuit board.

16. In a system comprising a first computing device having a first switch including a processing device configured to adhere to a cache coherent protocol, and a first memory device and a second memory device connected to the first switch, wherein the first memory device is associated with a first memory technology and the second memory device is associated with a second memory technology different from the first memory technology, the system further comprising a second switch connected to the first computing device, a method comprising:

receiving a first data request and a second data request by the second switch, wherein the first data request and the second data request adhere to the cache coherent protocol;

providing the first data request and the second data request to the processing device of the first switch;

based on receiving the first data request:

identifying, by the processing device, the first memory device based on the first data request;

translating, by the processing device, the first data request into a third data request based on the first memory technology, wherein the third data request adheres to a first memory protocol different from the cache coherent protocol;

transmitting, by the processing device, the third data request to the first memory device for accessing the first memory device;

based on receiving the second data request:

identifying, by the processing device, the second memory device based on the second data request;

translating, by the processing device, the second data request to a fourth data request based on the second memory technology, wherein the fourth data request adheres to a second memory protocol different from the first memory protocol and the cache coherent protocol; and transmitting, by the processing device, the fourth data request to the second memory device for accessing the second memory device.

17. The method of claim 16, wherein the first data request includes a remote direct memory access (RDMA) request, the method further comprising:

receiving, by the first switch, the RDMA request; and sending, by the first switch, a RDMA response.

18. The method of claim 17, wherein the second switch receives the RDMA request from a second computing device, and transmits the RDMA request to the first switch.

19. The method of claim 16, wherein the translating of the first data request includes translating a virtual memory address to a physical memory address, the method further comprising:

retrieving, by the first switch, data from the first memory device at the physical memory address.

20. The method of claim 16 further comprising:

receiving, by the second switch, a first packet associated with the first data request from second computing device;

receiving, by the second switch, a second packet from a third computing device;

grouping the first packet and the second packet to generate a grouped packet; and transmitting, by the second switch, the grouped packet to the first computing device.

* * * * *